US010591899B2

(12) United States Patent
Wike et al.

(10) Patent No.: US 10,591,899 B2
(45) Date of Patent: Mar. 17, 2020

(54) 3D PRINTER VISUALIZATION SHADER AND GEOMETRY PROCEDURAL

(71) Applicant: DreamWorks Animation L.L.C., Universal City, CA (US)

(72) Inventors: Jeffrey Wike, Universal City, CA (US); Andrew Pearce, Universal City, CA (US); Jon Lanz, Universal City, CA (US); Robert Knaack, Universal City, CA (US)

(73) Assignee: DreamWorks Animation L.L.C., Universal City, CA (US)

( * ) Notice: Subject to any disclaimer, the term of this patent is extended or adjusted under 35 U.S.C. 154(b) by 26 days.

(21) Appl. No.: 16/024,331

(22) Filed: Jun. 29, 2018

(65) Prior Publication Data

US 2019/0179288 A1    Jun. 13, 2019

Related U.S. Application Data

(60) Provisional application No. 62/596,721, filed on Dec. 8, 2017.

(51) Int. Cl.
*G05B 19/4099* (2006.01)
*G06T 19/20* (2011.01)
(Continued)

(52) U.S. Cl.
CPC ........ *G05B 19/4099* (2013.01); *B29C 64/393* (2017.08); *B33Y 50/02* (2014.12);
(Continued)

(58) Field of Classification Search
None
See application file for complete search history.

(56) References Cited

U.S. PATENT DOCUMENTS

| 2004/0239009 A1* | 12/2004 | Collins | B33Y 30/00 264/497 |
| 2015/0277811 A1* | 10/2015 | Lee | B29C 64/386 358/1.15 |
| 2016/0274830 A1* | 9/2016 | Jang | G06F 3/1208 |

FOREIGN PATENT DOCUMENTS

| EP | 2922029 A2 | 9/2015 |
| WO | 2018/140019 A1 | 8/2018 |

OTHER PUBLICATIONS

Chen et al., "Manufacturability Analysis of Infeasible Features in Polygonal Models for Web-Based Rapid Prototyping", International Conference on Manufacturing Automation, IEEE, Computer Society, 2010, pp. 120-127.

(Continued)

*Primary Examiner* — Ryan A Jarrett
(74) *Attorney, Agent, or Firm* — Dentons US LLP

(57) ABSTRACT

The present disclosure describes a technique for rendering a pre-visualization image representative of a 3D object to be printed by a 3D printer. The technique accesses a geometric digital model of the 3D object and receives one or more printer characteristics of the 3D printer. The one or more printer characteristics are associated with settlement of added material to the 3D object by the 3D printer. The technique further receives one or more material parameters of a volume of the added material that forms the 3D object. The technique further generates a digital aggregate build-up model of the 3D object using the geometric digital model, the one or more printer characteristics, and the one or more environmental parameters. Then the technique renders a pre-visualization image representative of the 3D object as the 3D object would be printed by the 3D printer based on the generated digital aggregate build-up model.

30 Claims, 14 Drawing Sheets
(5 of 14 Drawing Sheet(s) Filed in Color)

(51) Int. Cl.
*B33Y 50/02* (2015.01)
*B29C 64/393* (2017.01)
*G06T 17/20* (2006.01)
*B29C 64/165* (2017.01)

(52) U.S. Cl.
CPC .............. *G06T 17/20* (2013.01); *G06T 19/20* (2013.01); *B29C 64/165* (2017.08); *G05B 2219/35134* (2013.01); *G05B 2219/49007* (2013.01); *G06T 2219/2021* (2013.01)

(56) References Cited

OTHER PUBLICATIONS

Extended European Search Report received for European Patent Application No. 18203586.5, dated Aug. 2, 2019, 13 pages.
Talagani et al., "Numerical Simulation of Big Area Additive Manufacturing (3D Printing) of a Full Size Car", Sampe Journal, vol. 51, No. 4, Jul./Aug., 2015, pp. 27-36.
Ueng et al., "A Preview System for 3D Printing", Proceedings of the IEEE International Conference on Applied System Innovation IEEE-ICASI, 2017, pp. 1508-1511.

* cited by examiner

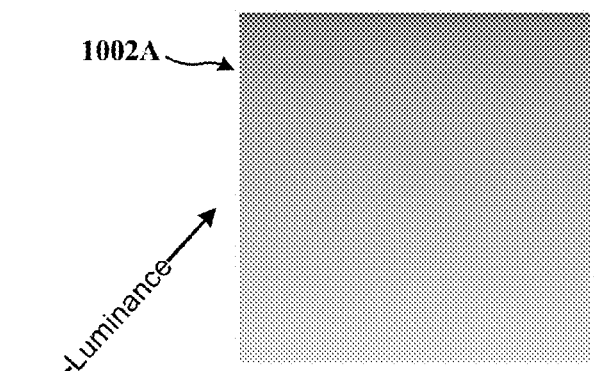
FIG. 10B
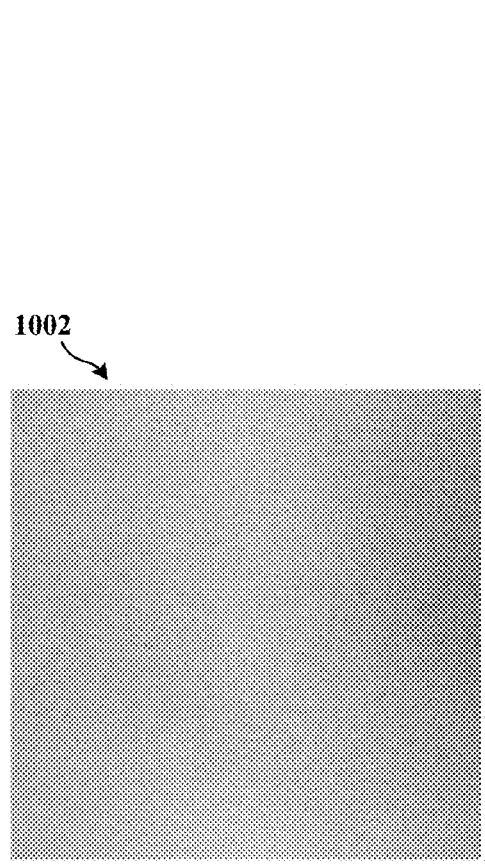
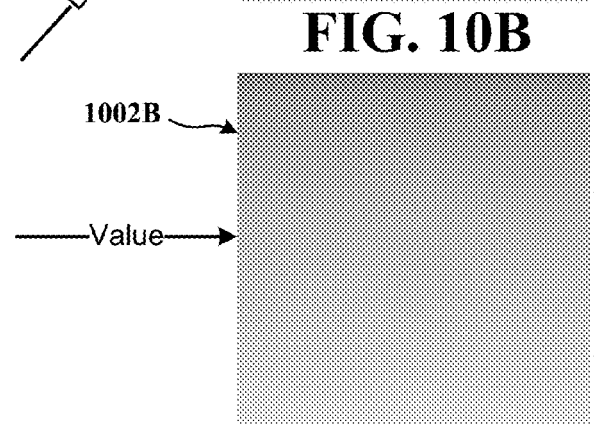
FIG. 10C
FIG. 10A
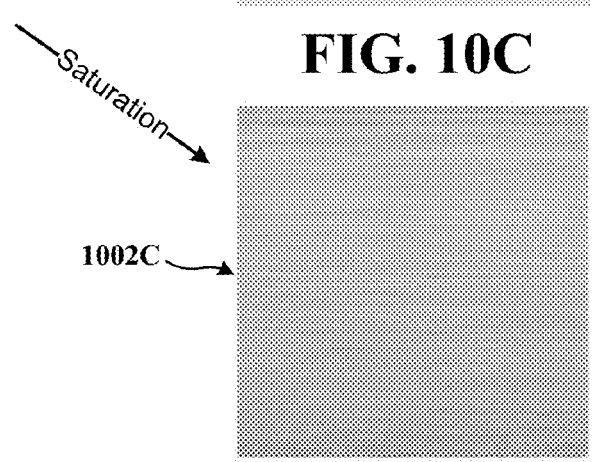
FIG. 10D
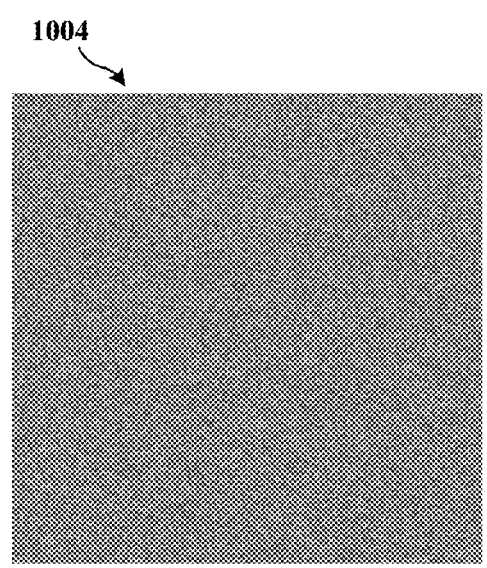
FIG. 10E

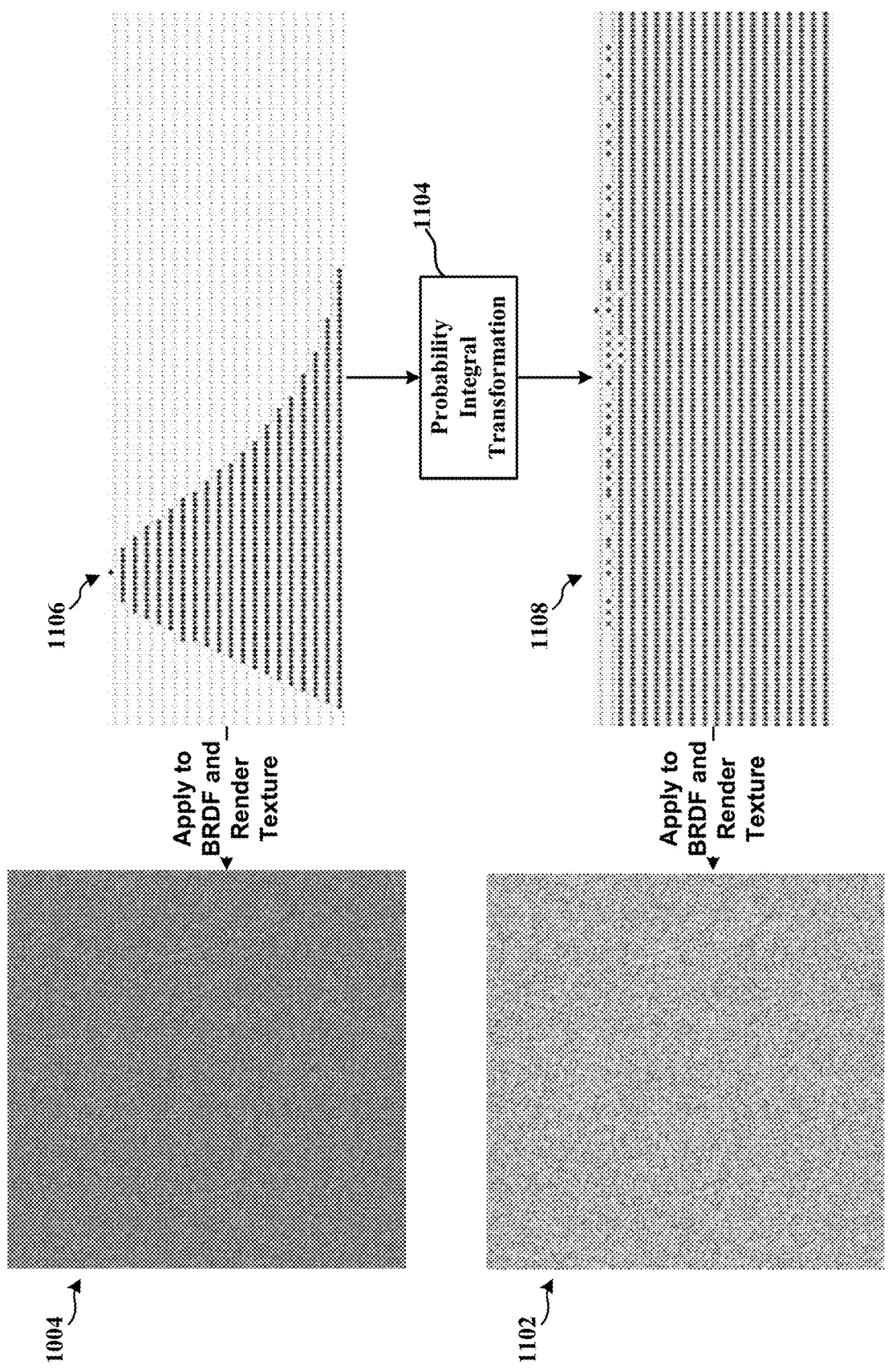

3D PRINTER VISUALIZATION SHADER AND GEOMETRY PROCEDURAL

CROSS-REFERENCE TO RELATED APPLICATIONS

The present application claims priority to Provisional Application No. 62/596,721, titled "3D Printer Visualization Shader and Geometry Procedural (3DP-VSGP)," filed Dec. 8, 2017, which is hereby incorporated by reference in its entirety.

FIELD

The present disclosure generally relates to 3D rendering techniques and, more specifically, to a technique for rendering a pre-visualization image representative of a 3D object to be printed by a 3D printer.

BACKGROUND

Current 3D printed objects have noticeable distinctions from a desired design such as color, texture, translucency, etc. These distinctions are often a result of printer characteristics, which can differ from 3D printer to 3D printer (e.g., different 3D printing methodologies including process, temperature, and other factors), and can be a result of unaccounted for material characteristics and environmental factors when forming the 3D object. In order to account for these distinctions most 3D printing techniques implement an iterative trial and error approach of re-printing the object with one or more parameter variations. However, this approach wastes resources and is time consuming as many of the realized 3D printed objects are discarded in favor of more desirable candidates. As such, a technique for rendering an accurate pre-visualization image representative of a 3D object to be printed by a 3D printer is desired.

SUMMARY

The following presents a simplified summary of one or more examples in order to provide a basic understanding of the disclosure. This summary is not an extensive overview of all contemplated examples, and is not intended to either identify key or critical elements of all examples or delineate the scope of any or all examples. Its purpose is to present some concepts of one or more examples in a simplified form as a prelude to the more detailed description that is presented below.

In accordance with some examples, a non-transitory computer-readable storage medium storing one or more programs configured to be executed by one or more processors of an electronic device for rendering a pre-visualization image representative of a 3D object to be printed by a 3D printer, the one or more programs including instructions for: accessing a geometric digital model of the 3D object; receiving one or more printer characteristics of the 3D printer, wherein the one or more printer characteristics are associated with settlement of added material to the 3D object by the 3D printer; receiving one or more material parameters of a volume of the added material that forms the 3D object; generating a digital aggregate build-up model of the 3D object using the geometric digital model, the one or more printer characteristics, and the one or more material parameters; and rendering a pre-visualization image representative of the 3D object as the 3D object would be printed by the 3D printer based on the generated digital aggregate build-up model.

In accordance with some examples, an electronic device for rendering a pre-visualization image representative of a 3D object to be printed by a 3D printer, the electronic device comprising: one or more processors; and memory storing one or more programs configured to be executed by the one or more processors, the one or more programs including instructions for: accessing a geometric digital model of the 3D object; receiving one or more printer characteristics of the 3D printer, wherein the one or more printer characteristics are associated with settlement of added material to the 3D object by the 3D printer; receiving one or more material parameters of a volume of the added material that forms the 3D object; generating a digital aggregate build-up model of the 3D object using the geometric digital model, the one or more printer characteristics, and the one or more material parameters; and rendering a pre-visualization image representative of the 3D object as the 3D object would be printed by the 3D printer based on the generated digital aggregate build-up model.

In accordance with some examples, a method for rendering a pre-visualization image representative of a 3D object to be printed by a 3D printer, the method comprising: accessing a geometric digital model of the 3D object; receiving one or more printer characteristics of the 3D printer, wherein the one or more printer characteristics are associated with settlement of added material to the 3D object by the 3D printer; receiving one or more material parameters of a volume of the added material that forms the 3D object; generating a digital aggregate build-up model of the 3D object using the geometric digital model, the one or more printer characteristics, and the one or more material parameters; and rendering a pre-visualization image representative of the 3D object as the 3D object would be printed by the 3D printer based on the generated digital aggregate build-up model.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 10A-10D depicts an example of raw empirical material texture that is sorted by luminance, value, and saturation.

FIG. 10E depicts an exemplary noise function generated material texture.

FIG. 11 depicts an example of texture that is uniformly generated from a non-uniform texture.

DETAILED DESCRIPTION

The following description is presented to enable a person of ordinary skill in the art make and use the various examples. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various examples. Thus, the various examples are not intended to be limited to those described herein and shown, but are to be accorded the scope consistent with the claims.

The present examples generally relate to rendering a pre-visualization image representative of a 3D object to be printed by a 3D printer. As will be seen, unlike rendering smooth surfaces, the present technique generates a digital aggregate build-up model of a 3D object with a non-smooth surface that takes one or more printer characteristics and one or more environmental parameters into account for a more realistic pre-visualization image of the realized 3D printed object. Examples of a technique for rendering a pre-visualization image representative of a 3D object to be printed by a 3D printer will now be presented with reference to various elements of a system and method. The system and method will be described in the following detailed description and illustrated in the accompanying drawing by various blocks, components, exemplary 3D printed objects, steps, processes, algorithms, etc. and may be implemented using electronic hardware, computer software, or any combination thereof.

Accordingly, in one or more examples, the components of the system described may be implemented in hardware, software, or any combination thereof and may be stored on or encoded as one or more instructions or code on a computer-readable medium. Computer-readable media includes computer storage media. Storage media may be any available media that can be accessed by a computer. By way of example, and not limitation, such computer-readable media includes a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1A:
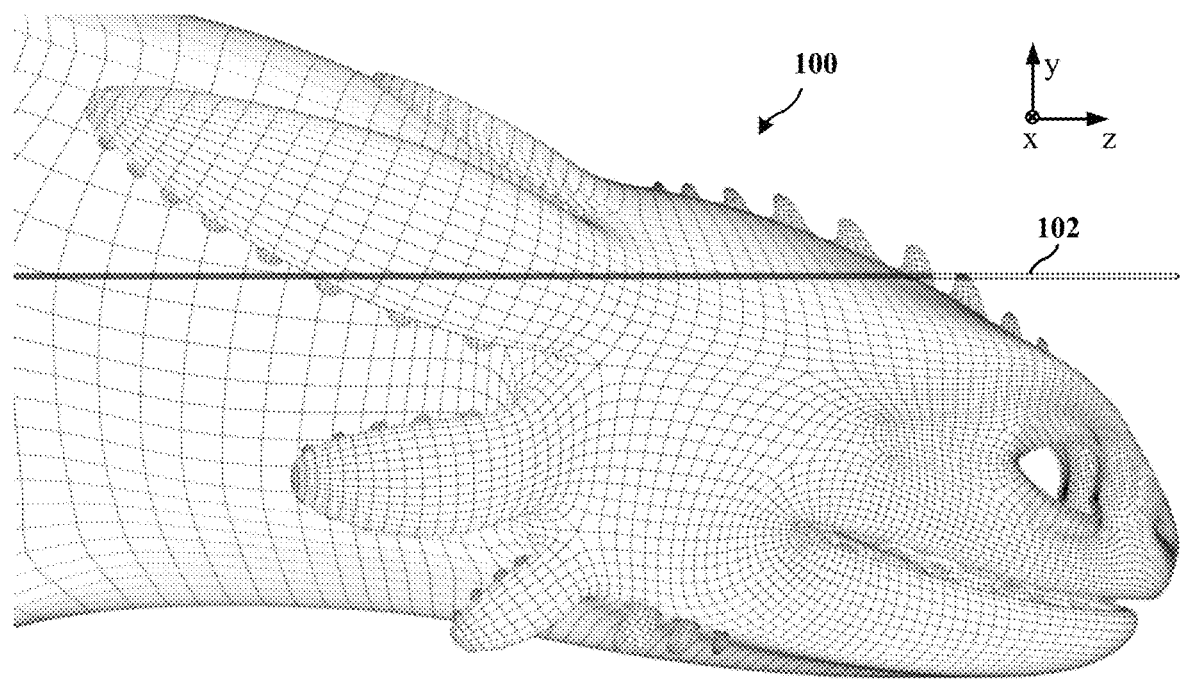
FIG. 1A illustrates an example of a geometric digital model of a 3D object to be printed using a 3D printer.

To print a 3D object, the geometric digital model is usually developed using computer-aided design (CAD) software. The geometric digital model is represented by a smooth mathematical function such as a non-uniform rational basis spline (NURBS) or subdivision surface, or a fine polygonal tessellation mesh that is continuous and smooth. FIG. 1A illustrates an example of a geometric digital model of a 3D object 100 to be printed using a 3D printer. The manufacture of the 3D object 100 is added layer by layer by the 3D printer. As such, stepping from the material added along a planar slice 102 of the 3D object as illustrated in FIG. 1A to an adjacent layer leads to discontinuities.

Figure 1B:
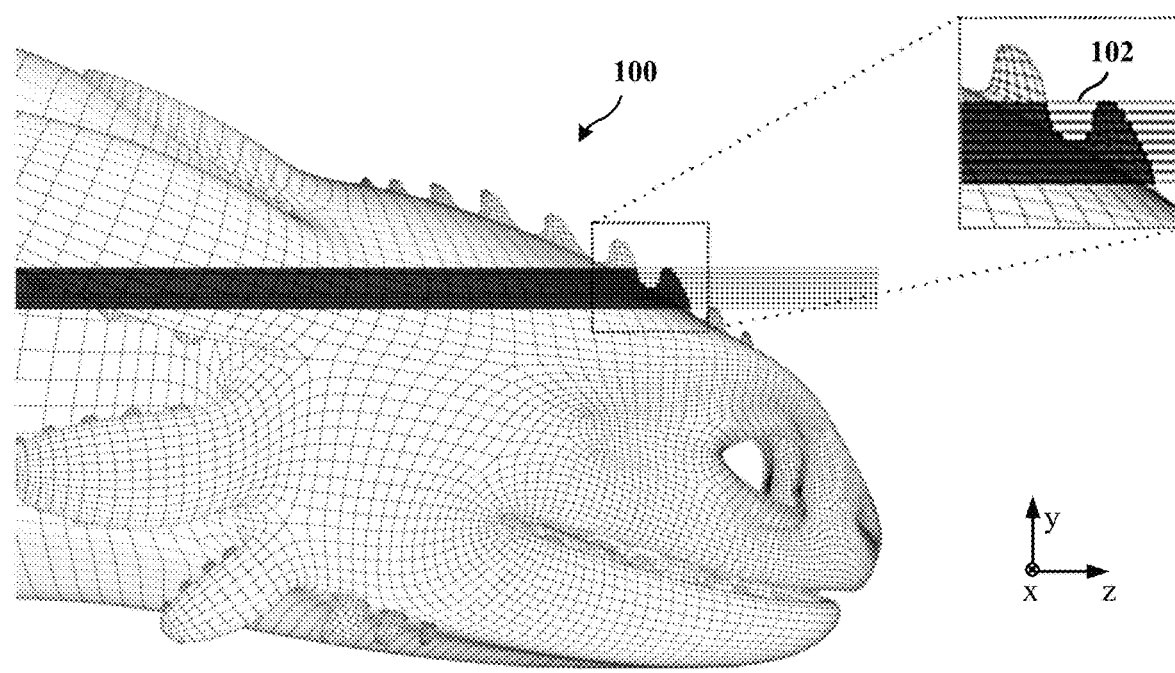
FIG. 1B illustrates an example of surface discontinuities of the 3D object of the geometric digital model.

FIG. 1B illustrates an example of surface discontinuities of the 3D object 100 of the geometric digital model. As depicted in the zoomed-in portion of FIG. 1B, each layer of a 3D printed object stacks on the next layer in rectangular/planar slices 102. In contrast, when viewed from a reasonable distance sufficient to see the entire object or large parts of the object, as depicted in the zoomed-out portion of FIG. 1B, the 3D object 100 can have an overall smooth appearance.

Figure 2A:
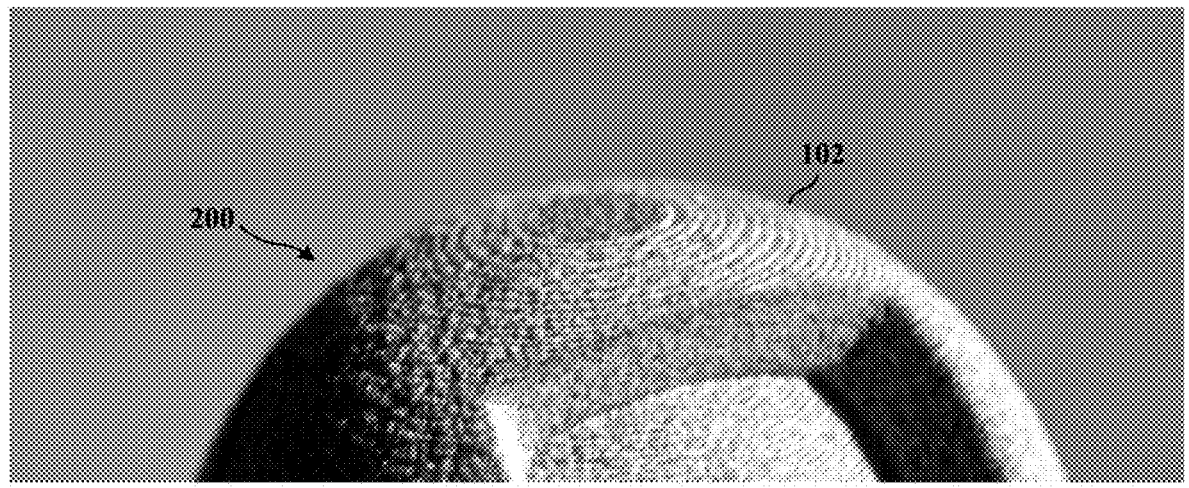
FIGS. 2A and 2B depict an exemplary macro photographs of a 3D printed object illustrating the surface discontinuities of the 3D object.
Figure 2B:
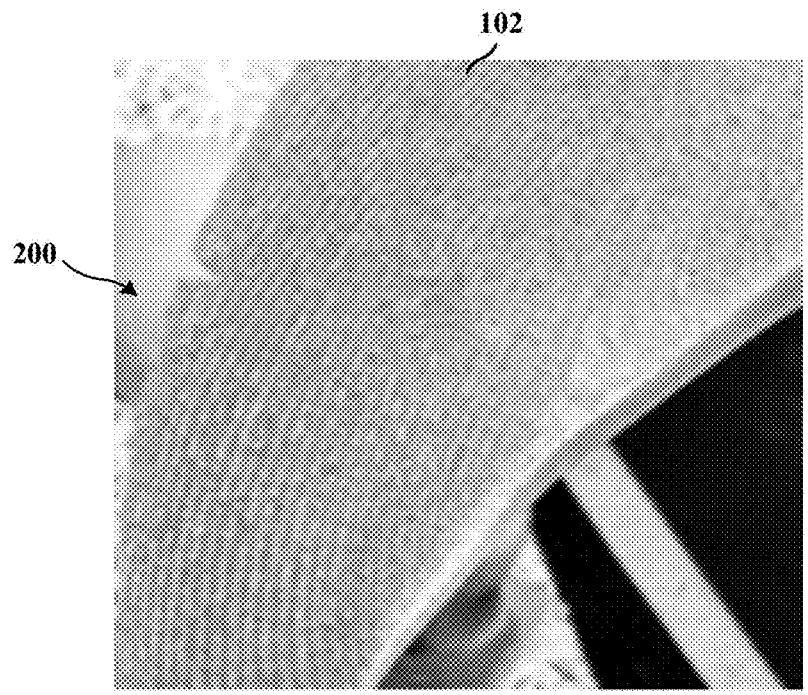

FIGS. 2A and 2B depict an exemplary macro photographs of a 3D printed object illustrating the surface discontinuities of the 3D object 200. The surface discontinuities give the 3D object 200 a textured stair-step appearance that deviates from the smooth geometric digital model. Notably, the edges of the stair-step surface discontinuities depicted in FIGS. 2A and 2B are not infinitely sharp. Instead, the edges depicted in the macro photographs are slightly rounded and imprecise due to artifacts in the printing process like heat, bonding, material defects, and other factors.

To model the appearance of 3D printed objects, the present disclosure combines a shader with a geometric procedural to render a pre-visualization image representative of how the 3D object would look after being printed by the 3D printer. The shader is a computer graphics package or program that adjusts the levels of light, darkness, and/or color of an image produced or rendered by computer software. The geometric procedural is a computer graphics package or program that creates digital 3D models of arbitrary surfaces or volumes either algorithmically and/or from previously defined geometric data. The combined shader and geometric procedural is configured to access a geometric digital model of the 3D object and receive one or more printer characteristics of the 3D printer. In some examples, accessing the geometric digital model of the 3D object includes receiving a position and orientation of the geometric digital model of the 3D object with respect to coordinates of the 3D object as referenced by the 3D printer.

The shader and geometric procedural is further configured to receive one or more material parameters of a volume of the added material that forms the 3D object. The shader and geometric procedural are further configured to generate a digital aggregate build-up model of the 3D object using the geometric digital model with the one or more printer characteristics and the one or more environmental parameters. Then the shader and geometric procedural are used by a renderer to generate a pre-visualization image representative of the 3D object as the 3D object would be printed by the 3D printer based on the generated digital aggregate build-up model.

Figure 3:
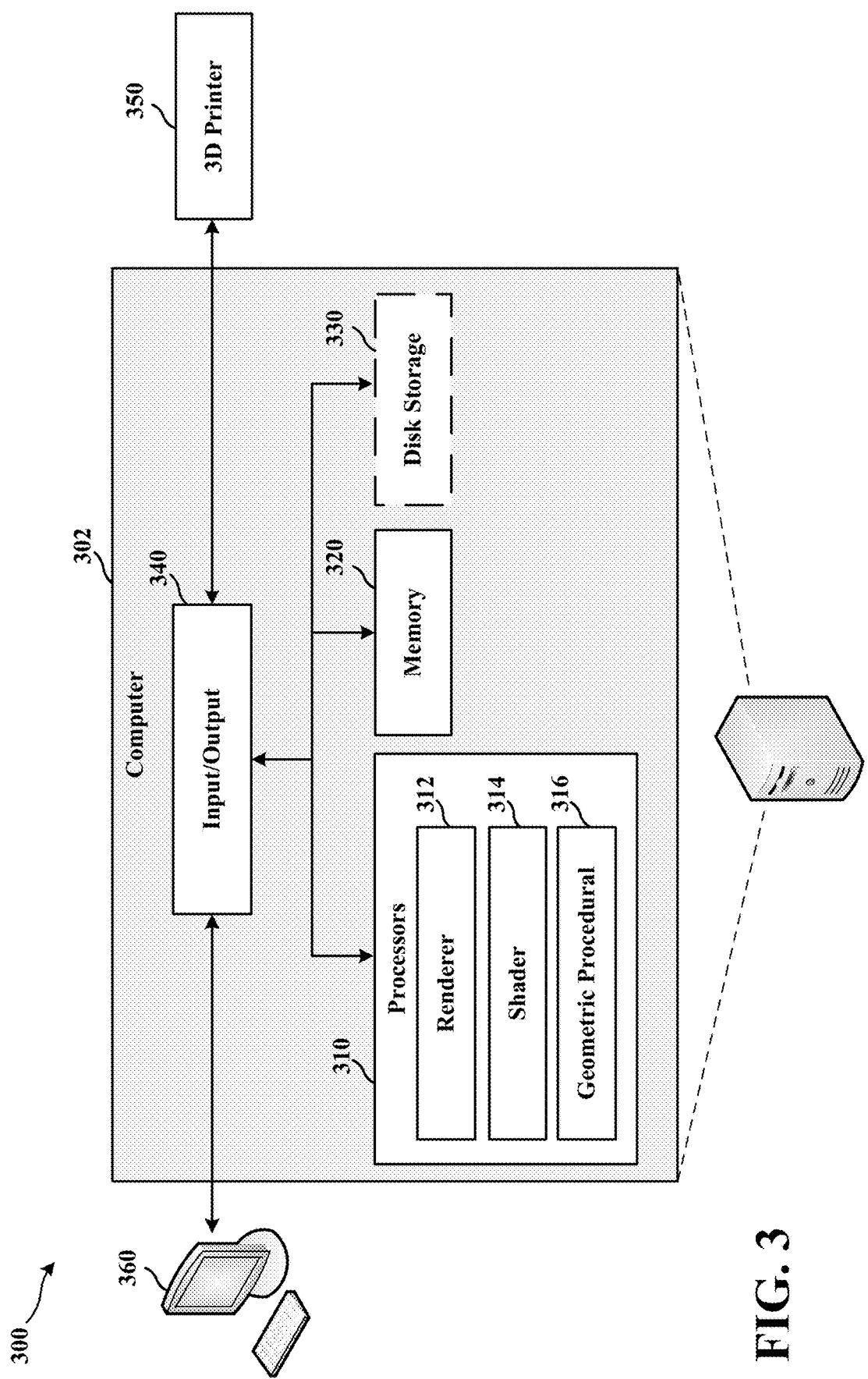
FIG. 3 illustrates an example of a shader and geometric procedural system.

FIG. 3 illustrates an example of a shader and geometric procedural system 300. The renderer 312, a shader 314 and a geometric procedural 316 are executed by one or more processors 310 as part of a computer system 302, as illustrated in FIG. 3. It should be appreciated that overlap can exist between the renderer 312, the shader 314, and the geometric procedural 316 even though FIG. 3 depicts the renderer 312, the shader 314, and the geometric procedural 316 as separate elements. For example, in some examples, the shader 314 and the geometric procedural 316 are subroutines or packages accessed through the render 312. In such examples, the renderer 312 includes both the shader 314 and the geometric procedural 316.

The computer system 302 also includes memory 320, optional disk storage 330, one or more input/output interfaces 340 to connect with a 3D printer 350, and one or more user input peripheral 360 such a display, keyboard, mouse, etc. In some examples, the shader and geometric procedural system 300 and the 3D printer 350 are electrically coupled as separate units as depicted in the computer system 302 of FIG. 3. In some examples, the computer system 302 and the 3D printer 350 are integrated as a standalone unit. The shader and geometric procedural system 300 can be configured to test 3D print manufacturing materials, processes, modifications, and enhancements to both prototype new 3D printing capabilities, ensure compatibility of materials and techniques, and suitability of 3D printing to ensure desired design characteristics.

To further correlate the pre-visualization image with the 3D printer, the shader and geometric procedural system 300 includes configurable parameters, as further discussed below, that match the design specifications of the 3D printer 350. In some examples, these configurable parameters are further modified to more closely match various 3D printing hardware and/or processes. In some examples, the parameters and/or components implemented in the shader and geometric procedural system 300 are reverse engineered from the 3D printing process of one or more 3D printers.

The shader and geometric procedural system 300 is configured to receive one or more printer characteristics of the 3D printer 350. It is contemplated that the shader and geometric procedural system 300 includes the one or more printer characteristics to represent physical characteristics of the object being printed, so that reaction to pressure, object collision, etc. can be simulated. As such, the one or more printer characteristics are 3D printer specific and differ from 3D printer to 3D printer.

In some examples, the shader and geometric procedural system 300 includes the one or more printer characteristics implemented as coefficients used in functions to model processing effects on 3D printed objects. The printer characteristics may include but are not limited to: temperature, diffusion, miscibility, as well as environmental effects such as radiation (e.g., UV, infrared, etc.), humidity, pressure, wind, erosion, and aging. The one or more printer characteristics include coefficients for at least one of target temperature, print time, minimum printing width per layer (e.g., horizontal voxel resolution), vertical voxel resolution, printer volume dimensions (e.g., print/bin volume), minimum printing head deflection per layer, and corner curvature of the material per minimum width with rounded edges) (e.g., edge precision due to cooling profile affecting shape). These one or more printer characteristics are provided to the shader 314 and the geometric procedural 316 to simulate the aggregate build-up model of the specific 3D printer.

In some examples, the shader and geometric procedural system 300 receives one or more environmental parameters. The one or more environmental parameters include any one of ambient temperature, ambient humidity, and altitude. The digital aggregate build-up model is further generated using the one or more environmental parameters. In general, the environmental parameters may affect the added material that forms the 3D object and the 3D printer in a way that alters the appearance of the printed 3D object.

In some examples, the shader and geometric procedural system 300 auto-detects the 3D printer and determines the one or more printer characteristics from the auto-detected 3D printer. In some examples, the one or more printer characteristics can be manually entered through the one or more user input peripherals 340. In such examples, a configuration file or other driver-type file can be entered by a user through the user input peripheral 340. In some examples, the one or more printer characteristics are provided by the 3D printer manufacturer, which include the one or more printer characteristics as well as other information associated with settlement of added material to the 3D object by the 3D printer. In some examples, the settlement of added material refers to resolution and/or position of the added material as the added material settles into place while the 3D object is being printed. Due to differences in printer characteristics, there may be variations in the way materials settles, as material is added layer by layer, for example. In addition to information relating to the settlement of material, other parameters that may be used by the shader and geometric procedural system 300 may also include characteristics of the medium compatible with the 3D printer, such as color bleeding, color integrity, discoloration due to heat, and information indicating how different mediums of print materials (e.g., powders, bonding agents, coloring agents, conductive agents, etc.) affect the appearance of a printed 3D object.

In addition to receiving one or more printer characteristics of the 3D printer 350 and receiving the environmental parameters, the shader and geometric procedural system 300 may receive one or more material parameters of a volume of the added material that forms the 3D object. In some examples, the one or more material parameters of the volume of the added material include coefficients or parameters to characterize at least one of single-scattering albedo, volumetric absorption, scattering (e.g., surface scattering, etc.), anisotropy, refractive index, thermal conductivity, electrical conductivity, and diffusion (e.g., color bleeding, glossiness, etc.). It should be appreciated that the one or more material parameters describe artifacts of the printing process. For example, the diffusion of color (e.g., color bleeding) is a result of the application of bonding agent and heat across adjacent volumes of added material. In some examples, the one or more material parameters include diffusion coefficients to characterize diffusion (e.g., color bleeding, conductivity, glossiness, etc.) across adjacent volumes of added material (e.g., diffusion due to application of bonding agent and heat.

In some examples, the shader and geometric procedural system 300 may determine changes in one or more material parameters of the volume from one or more thermal stresses caused from temperature gradients, thermal expansion or contraction, and thermal shocks of the volume of added material. For example, heat applied to an object may stress the material and cause color bleeding, loss of color integrity, discoloration, etc., resulting in changes to color tone, hues, albedo, along regions exposed to a temperature gradient. To account for such changes in one or more physical material properties, the shader and geometric procedural system 300 adjusts the one or more material parameters of the volume of added material along regions exposed to the one or more thermal stresses.

Once the geometric digital model of the 3D object is accessed and the one or more printer characteristics of the 3D printer along with the one or more material parameters are received, the shader and geometric procedural system 300 generates a digital aggregate build-up model of the 3D object using the geometric digital model with the one or more printer characteristics and the one or more material parameters.

The shader and geometric procedural system 300 generates the digital aggregate build-up model using a surface of surrounding voxels represented by determining a surface of surrounding voxels and generating a polygonal tessellation mesh for a non-uniform rational basis spline or subdivision surface. The digital aggregate build-up model represents an accurate digital copy of the 3D printed object. In some examples, the metadata, such as creation date, author, input parameters, rights management, watermarking and other security parameters can be maintained and edited in the digital aggregate build-up model.

1. Marching Cubes

Figure 4A:
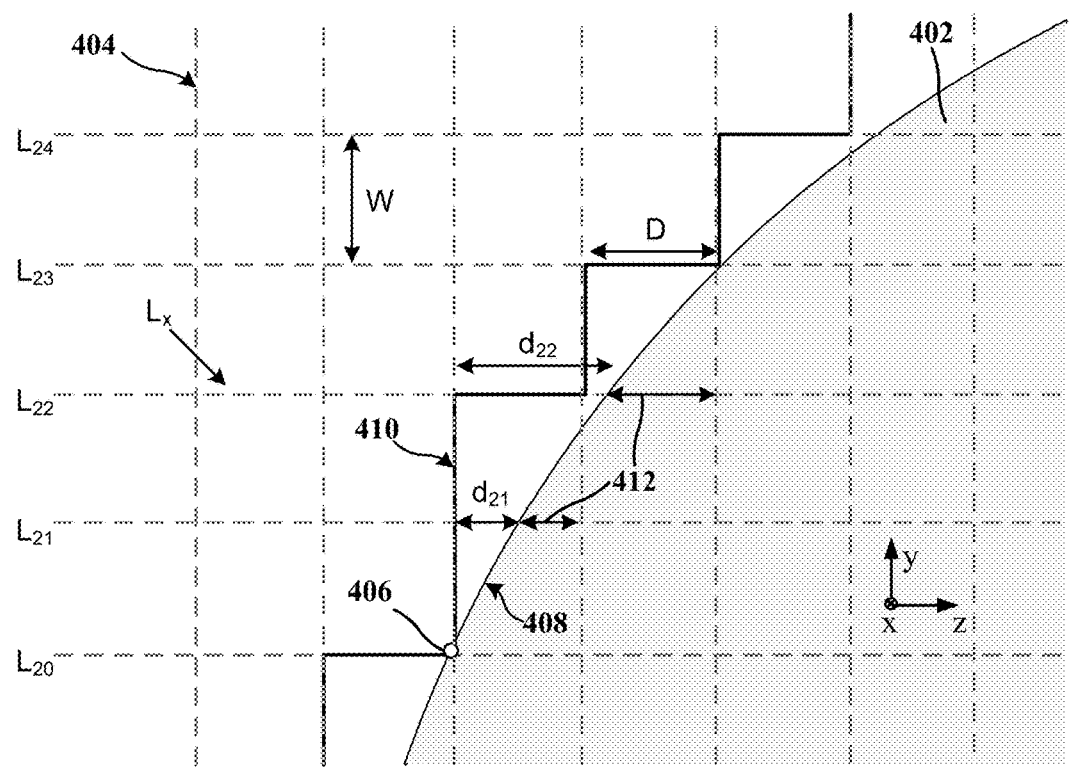
FIG. 4A illustrates an exemplary marching cube approach for generating the digital aggregate build-up model.

One approach for generating the digital aggregate build-up model is to implement marching cubes. As depicted in the cross-section of FIG. 4A, the cubes approach overlays the geometric digital model 402 of the 3D object with a voxel grid 404. By way of example, the shader and geometric procedural system 300 overlays the geometric digital model 402 of the 3D object with a voxel grid 404 where one corner of the voxel grid is situated at origin point 406 on a surface 408 of the geometric digital model 402, as depicted in FIG. 4A. In some examples, the width dimension, W, and deflection dimension, D, of each voxel of the voxel grid 404 corresponds to a minimum resolution of the width and deflection of the 3D printer. In some examples, W corresponds to the thinnest possible layer that the 3D printer can print, and D corresponds to the minimum deflection possible of the printing head from the position it printed on the layer below.

After the voxel grid 404 is overlaid with the geometric digital model 402 of the 3D object, the shader and geometric procedural system 300 then determines a voxelated surface 410 of the build-up model, which corresponds to external surfaces of one or more adjacent voxels of the voxel grid that follows along the surface 408 of the geometric digital model 402. As depicted in FIG. 4A, a voxelated surface 410 is determined by following the external surface segments of a voxel determined using the voxel grid 404 that only intersects with the surface 408 of the geometric digital model 402 at a corner edge of a voxel as is the case with the origin point 406. The resulting voxelated surface 410 is outside of the surface 408 of the geometric digital model 402 so as to fully enclose the geometric digital model 402. As such, the distances on adjacent layers of a single voxel range vary around the deflection dimension, D. For example, the distance $d_{22}$ on layer $L_{22}$ is greater than a deflection dimension, D, away from the surface 408 of the geometric digital model 402, whereas $d_{21}$ on layer $L_{21}$ is less than a deflection dimension, D, away. As such, surface voxels of the one or more adjacent voxels of the voxel grid include an internal surface segment 412 that intersects with a surface 408 of the geometric digital model 402 of the 3D object.

Once the voxelated surface 410 is determined, the shader and geometric procedural system 300 adapts a surface of the build-up model corresponding to the surface of the geometric digital model 402 of the 3D object to the voxelated surface 410. Consequently, the voxelated surface 410 of marching cubes approach, as depicted in FIG. 4A, forms sharp edges with a stair-step geometry along the voxel grid 404. This approach can be further adapted so that the internal surface segment is situated at least a predetermined distance from a voxel edge. For example, instead of having the origin point 406 situated on the surface 408 of the geometric digital model 402, the origin point 406 can be situated within the geometric digital model 402 of the 3D object such that the voxelated surface 410 intersects with the surface 408 of the geometric digital model 402. In this example, portions of the voxelated surface 410 are outside of the surface 408, while other portions of the voxelated surface 410 are inside of the surface 408. It should be appreciated that variations to this example are contemplated. For instance, all portions of the voxelated surface 410 may be inside of the surface 408.

The resulting mesh from this approach, when visualized, correlates with the 3D printed object. However, the visualization will have infinitely sharp edges to the stair-step geometry similar to the voxelated surface 410 depicted in FIG. 4A and does not include the rounded contours of the actual printing process depicted in FIGS. 2A and 2B. Still, it is an improvement over representing the geometry of the 3D printed object with a completely smooth surface.

2. Procedural Bevels

Figure 4B:
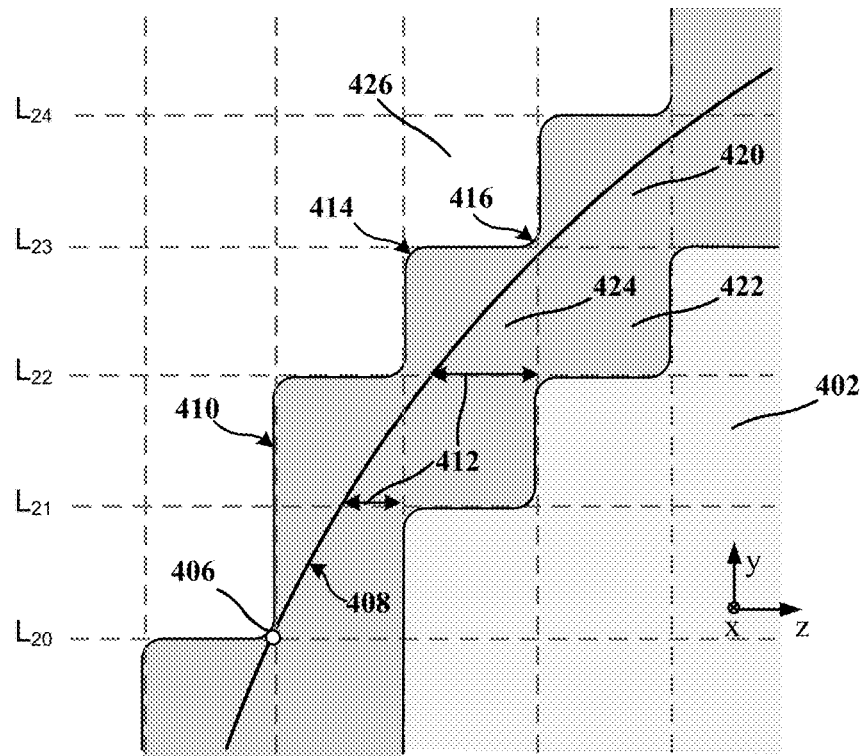
FIG. 4B illustrates an exemplary procedural bev approach for generating the digital aggregate build-up model.

Another approach for generating the digital aggregate build-up model is to implement procedural bevel approach, as depicted in the cross-section of FIG. 4B. For clarity, the darker areas above and below the surface 408 of the geometric digital model 402 are surface voxels that are intersected by the geometric digital model 402. As depicted in the cross-section of FIG. 4B, the procedural bevel approach rounds the sharp outer (convex) corners and bevels the sharp inner (concave) edges of the voxelated surface 410. The shader and geometric procedural system 300 is configured to add one or more bevel corners to the voxelated surface along a concave external surface corner 416 between two or more orthogonally adjacent surfaces of two or more voxels (e.g., surface voxels 420, 422, 424). As depicted in FIG. 4B, the concave external surface corner 416 extends outside the two or more voxels (e.g., surface voxels 420, 422, 424), thereby adding material to an otherwise empty voxel (e.g., empty voxel 426). It should be appreciated that the procedural bevels are three-dimensional (3D). As such, three orthogonally adjacent surfaces of three voxels are rounded to form a concave external surface corner 416 with a spherical contour. The shader and geometric procedural system 300 is further configured to bevel one or more edges to the voxelated surface along a convex edge 414 of two or more orthogonally adjacent surfaces of a single surface voxel 424. As depicted in FIG. 4B, the beveled surface of the convex edge 414 extends inside the single surface voxel 424, thereby removing (beveling) the edge of the single surface voxel 424.

Figure 5A:
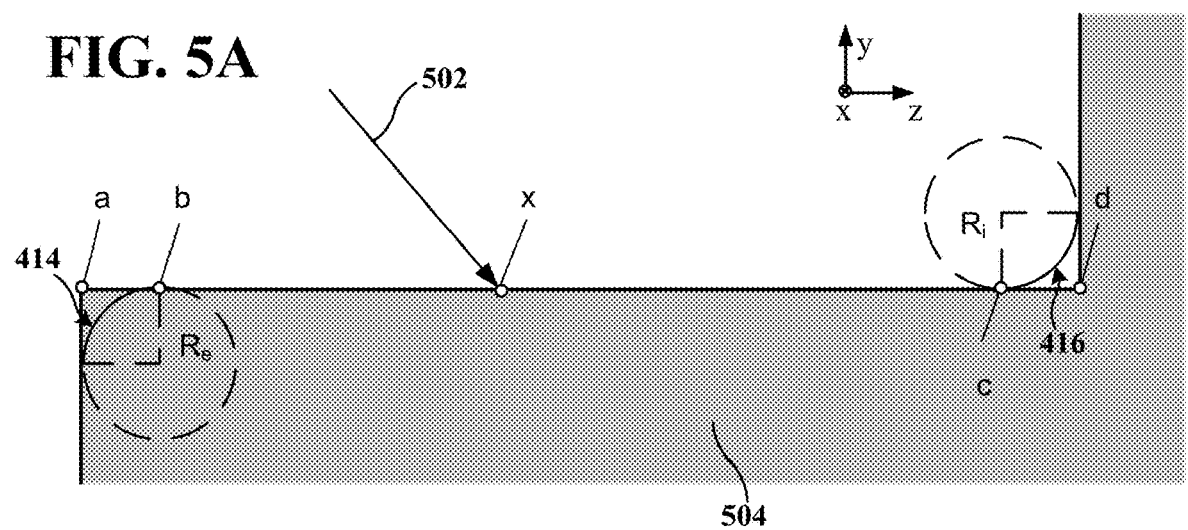
FIGS. 5A-5C illustrate an example of procedurally ray tracing a beveled voxel grid in 2D cross-sections.
Figure 5B:
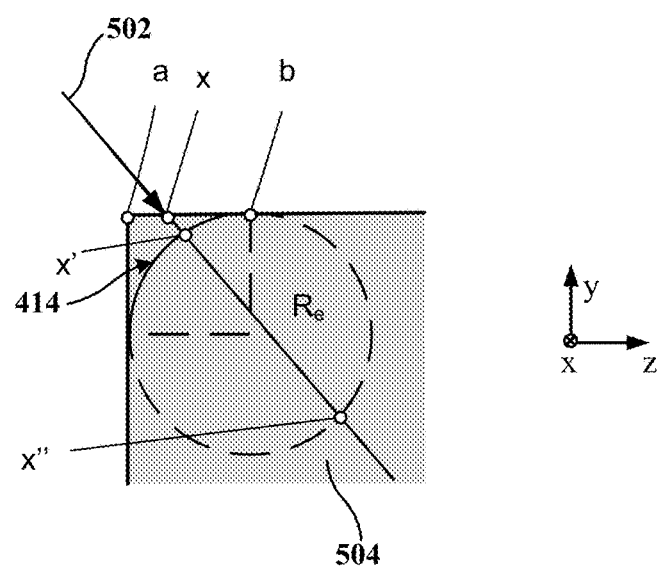
Figure 5C:
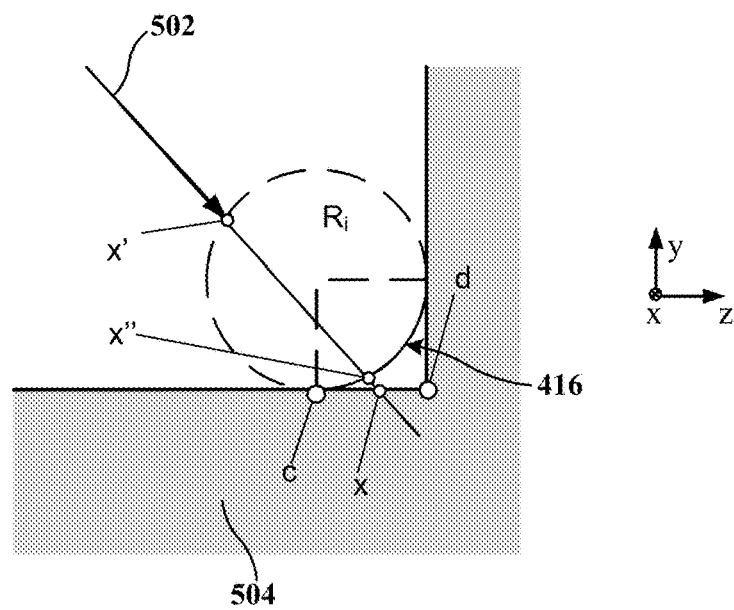

In order to add one or more bevel corners to the voxelated surface along a concave external surface corner 416 and bevel one or more edges to the voxelated surface along a convex edge 414, the shader and geometric procedural system 300 implements a ray tracing technique, as further described in FIGS. 5A-5C, where the walls of the boundary voxels are directly intersected, and intersection points and surface normals are procedurally adjusted for any of the intersections that occur closer to concave surface corner 416 or a convex surface edge 414.

FIGS. 5A-5C illustrate an example of procedurally ray tracing a beveled voxel grid in two dimensional (2D) cross-sections. As depicted in FIG. 5A, the bevels are represented by a circle in 2D (or cylinder or conic section in 3D) of radius $R_e$ or $R_i$ situated in the plane of the intersection point x at bevel width distance $R_e$ or $R_i$ from adjacent voxels. In FIG. 5A, a 2D cross-section of a ray 502 intersecting a boundary voxel 504 is depicted, where the cross-section is in the orthonormal plane of the intersection point. The surface segment between endpoint a and endpoint d represents the side of the boundary voxel 504, with the ray 502 intersecting that surface segment at intersect point x. The intersection point x of the ray 502 is between point h and point c, which is at least a predetermined distance from a voxel edge. As such, the intersection is further from endpoint a and endpoint d than the applicable bevel width distance $R_e$ or $R_i$. Because the intersect point x is between point b and point c, the unmodified ray/plane intersection point is used as the point to be shaded. The normal for the intersection point x is the normal of the voxel side's plane, which is easily computed since two values of any computed normal will be 0, and the other either 1 or −1, in this case (0, 1, 0); the normal points in the positive y direction.

As depicted in FIGS. 5B and 5C, when intersection point x is between endpoint a and point b or point c and endpoint d, which is less than the predetermined distance from a voxel edge, then the intersection with the voxel face is ignored and a circle contour radius is mathematically intersected with the ray 502 to produce points x' and x". As depicted in FIG. 5B, if the vertex/edge is identified as convex, then the intersection, x 9, of the circle with the ray 502 that is nearer to the origin of the ray 502 is used as the actual intersection point and normal. As depicted in FIG. 5C, if the vertex/edge is identified as concave, then the intersection, x", of the circle with the ray 502 that is further from the origin of the ray 502 is used.

It should be appreciated that the shader and geometric procedural system 300 extends this technique to 3D where the intersection of the spheres/cylinder/conic section replaces the intersection of the circle. In 3D, the shader and geometric procedural system 300 is configured to compute the normal for the intersection point on a bevel. Notably, this computation can be optimized because in 3D the axes are aligned. For a cylinder, the normal can be computed as a 2D geometric angle computation. For a sphere, it is the normalization of the intersection point with the sphere center translated to origin. That is, the center of the sphere intersected from the intersection point, normalize that tuple and the result is the normal.

Figure 6:
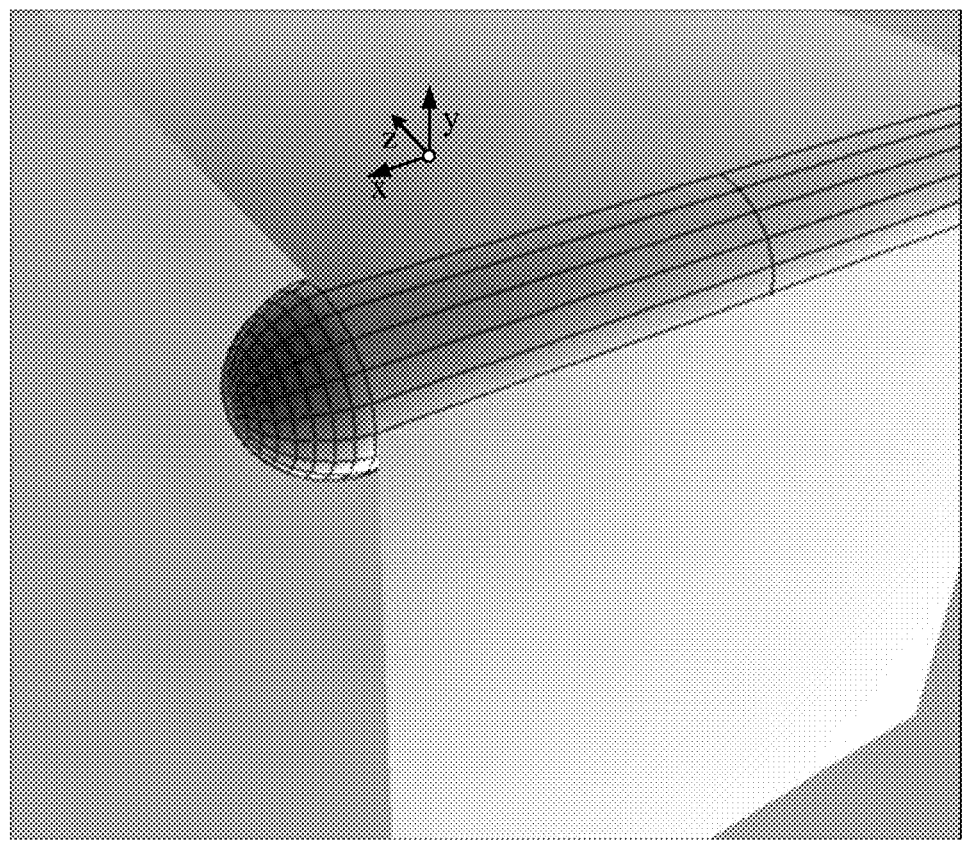
FIG. 6 illustrates an example of procedurally ray tracing a beveled voxel grid in 3D.

FIG. 6 illustrates an example of procedurally ray tracing a beveled voxel grid in 3D. As depicted in FIG. 6, the circles in FIG. 5A become cylinders with two spheres of identical radius capping the cylinder at each end. It should be appreciated that if the radius is different at either end of the voxel then the bevels are transitioned between upward and downward bevels that have differing radii, where the solid to intersect becomes a conic section with appropriate radii $R_a$ and $R_b$ at their respective end. For example, when one edge is beveled and an adjacent voxel is not beveled, the radius is transitioned from its appropriate radius to zero radius.

The sphere-capped cylinder depicted in FIG. 6 is mathematically created to produce a bevel. In this example, cylinder contours from the top voxel surface in the positive z direction to the front voxel face in the negative y direction. Noticeably, both ends of the bevel have identical radii as the contour lines extend in parallel along the x axis. It should be appreciated that if there is a difference in the bevel radius at either end, then a conic section, capped with spheres of distinct radii is mathematically described instead of a cylinder.

In some examples, the shader and geometric procedural system 300 implements a pre-processing step where each vertex of each boundary voxel is classified based on the boundary/non-boundary status of all eight voxels sharing that edge to encode the type and placement of bevel radius to use. With eight voxels around each vertex, there are 256 ($2^8$) possible geometry combinations of full/empty voxels. Given finite rotational symmetries in the permutation patterns of full/empty voxels, a lookup table can be generated that places a sphere of the appropriate radius at the appropriate location once as a pre-process. The lookup table can then be sampled in the pre-process step to properly categorize each vertex that lies on a boundary voxel. The vertices are marked as convex, concave, or ignore, with a quad value of location and Radius (x, y, z, R) which represents the location of the center of the sphere with respect to a voxel vertex and the bevel radius dependent on location, orientation, and neighboring factors.

Once the vertices are marked, the shader and geometric procedural system 300 constructs the bevel along an edge by taking the spheres placed at the vertices of each end of the edge. If the vertices do not have an equal convex/concave setting or if either of them is set to ignore, then the shader and geometric procedural system 300 does not generate a bevel.

3. Voxelated Level Sets

Another approach for generating the digital aggregate build-up model is to implement level sets. Mathematically, a level set is a set for a real-valued function $f$ of n real variables where the function takes on a given constant value c. In two dimensions (i.e., 2D), when all the real-valued solutions (e.g., roots) are a function of two variables x and y (i.e., n=2), a level set is a curve known as a level curve, contour line, or isoline. By way of example, each contour line in a topographic maps is a 2D level set where all points within the topographic surface evaluates to a specific, constant value (e.g., elevation). In three dimensions (i.e., 3D) when all real-valued solutions (e.g., roots) are a function in three variables x, y, and z (i.e., n=3), a level set becomes a level surface (or isosurface). Similar to a topographic map, a three dimensional (i.e., 3D) level set refers to a subset of all points within a volume where a function of those points evaluates to a specific, constant value. It should be appreciated that these concepts can be extended to higher dimensions (i.e., n>3) at which point the level set becomes a level hypersurface.

In the level set approach, the shader and geometric procedural system 300 overlays the geometric digital model of the 3D object with a voxel grid that spans a volume so as to enclose the 3D object. Usually, at least one dimension of a voxel of the voxel grid corresponds to a minimum resolution of the 3D printer. Then the geometric procedural system 300 associates a field value for each voxel in the dimensions of the voxel grid that encloses the 3D object. Generally, these values are defined by positions of particles or vertices within the volume that have an associated field value along with some fall-off. The level set then becomes a surface that is procedurally defined in this volume where the field for all parts of the volume is at a constant, specifiable value, v.

In order to determine voxelated surface of the build-up model, the geometric procedural system 300 root finds the field value, v, in the voxels of the volume, which corresponds to a level set evaluated along a surface of the geometric digital model of the 3D object where the field value remains a constant. When a field value of the specifiable value, v is found in the voxel, a ray/object intersection event is recorded and the one or more material properties are evaluated.

Figure 7A:
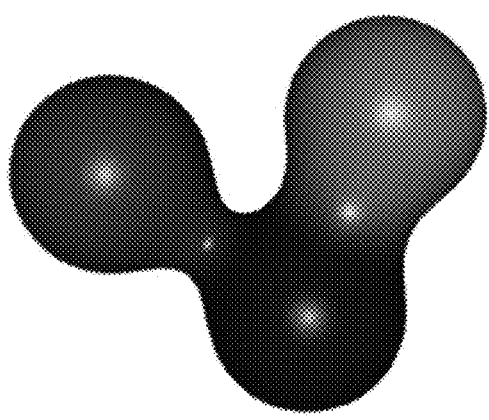
FIG. 7A illustrates an exemplary approach of using level sets for generating the digital aggregate build-up model for three fluid particles.

FIG. 7A illustrates an exemplary approach using level sets for generating the digital aggregate build-up model for three fluid particles. As depicted in FIG. 7A, the three particles have a constant field decay with distance that defines a level set where field strength is increased as more than one field overlaps. As evaluated, the level set gives a melding appearance at the surface for the particular value of v that is being visualized.

Figure 7B:
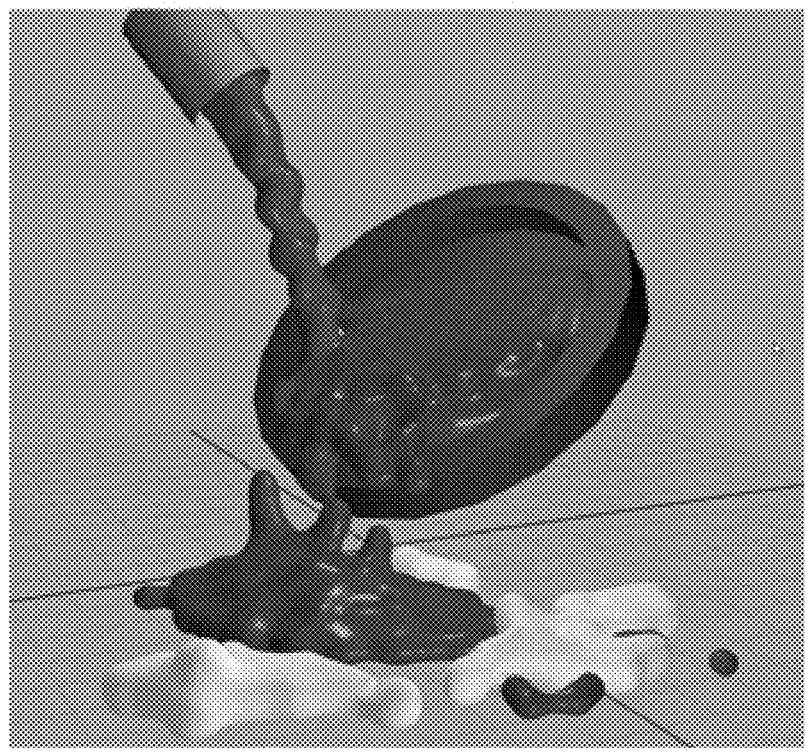
FIG. 7B illustrates an example of a level set approach for generating the digital aggregate build-up model for a large number of fluid particles.

FIG. 7B illustrates an example of a level set approach for generating the digital aggregate build-up model for a large number of fluid particles. As depicted in FIG. 7B, when the number of particles increases, the resulting level set surfaces begin to resemble a fluid.

Figure 8A:
FIG. 8A depicts an example of highly detailed water produced from level sets.

It should be appreciated that with high particle counts, the surfaces can be highly detailed. For example, FIG. 8A depicts an example of highly detailed water produced from level sets. In this instance, the high detail of the fluidic ripples and wavelets at the surface of the water are easily discernible.

Figure 8B:
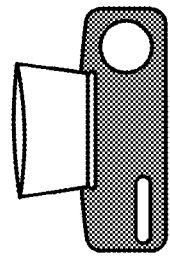
FIG. 8B depicts an example of a 2D face profile that is defined by a level set.

FIG. 8B depicts an example of a 2D (cartoon-ish) face profile that is defined by a level set. In this example, a level set is created with a specifiable value, v, of ~0.2, which corresponds to a contour line that closely tracks the face profile. It should be appreciated that the basis for the specified value, v, depends on the distribution of values in the voxel grid. This means that if the voxels in FIG. 8B had been seeded with other field values, the specifiable value, v, could differ from the ~0.2 value provided in this example.

The field values provide meaningful spatial information of the object. For example, the different field values in the voxel grid depicted in FIG. 8B represent the distance to the surface of the original digital model, which is where the specifiable value is held constant (e.g., v=0.2). In some examples, the field values represent the shortest distance from the surface of the geometric model determined from a function of the spatial variables (e.g., x, y, and z). In correspondence to the spatial position of the contour line of the face profile, the specifiable value of ~0.2 depicted in FIG. 8B are the darkest voxels. In contrast, the lightest voxels are situated at field values at the two extreina (e.g., v=−1 or v=1), which are distal from the contour line of the face profile. As the field values approach the specified value of ~0.2 the voxels darken in proportion to the proximity to the contour line of the face profile. Even though for simplicity, the contouring of the level set in this example was left off, it should be appreciated that contouring between the darkest voxel with values close to specifiable value (e.g., v=0.2) and adjacent voxels with values different from specifiable value (e.g., v≠0.2) meld somewhat together such that the edges and corners are rounded, producing the appearance of bevels as depicted in FIGS. 5A-5C.

In 3D, the geometric procedural system 300 applies a similar principle, where voxels intersecting the surface of the geometric digital model of the 3D object have a specifiable value, voxels interior the 3D object have a field value lower than the specifiable value, and voxels exterior the 3D object have a field value greater than the specifiable value. As such, the geometric procedural system 300 determines solutions (e.g., roots to the function of spatial variables) in the dimensions of the voxel grid that encloses the 3D object, which has the effect of melding edges together and rounding corners to produce the appearance of bevels, similar to the highly detailed water of FIG. 8A. It should also be appreciated that a higher resolution, as depicted in FIG. 8A, can be achieved by a grid with a decreased voxel size, which can be populated with field values determined from a function using the spatial variables (e.g., sqrt($x^2+y^2$) on a z-plane cross-section).

4. Residual Surface Material

The 3D printing processes can often produce unintended residual surface material, which alters the surface appearance and changes material properties. For example, some 3D printing processes combine a binder or binding agent with a powder to form the 3D object. Imprecision in the process can result in some areas of the 3D object with more powder than desired. In an effort to remove the residual surface material, some 3D printing processes sandblast the 3D object. However, even after sandblasting, some excess material can remain due to hard to reach areas (e.g., concavities and crevices) and/or the sandblasting media not having fine enough particles to reach some areas.

Figure 9A:
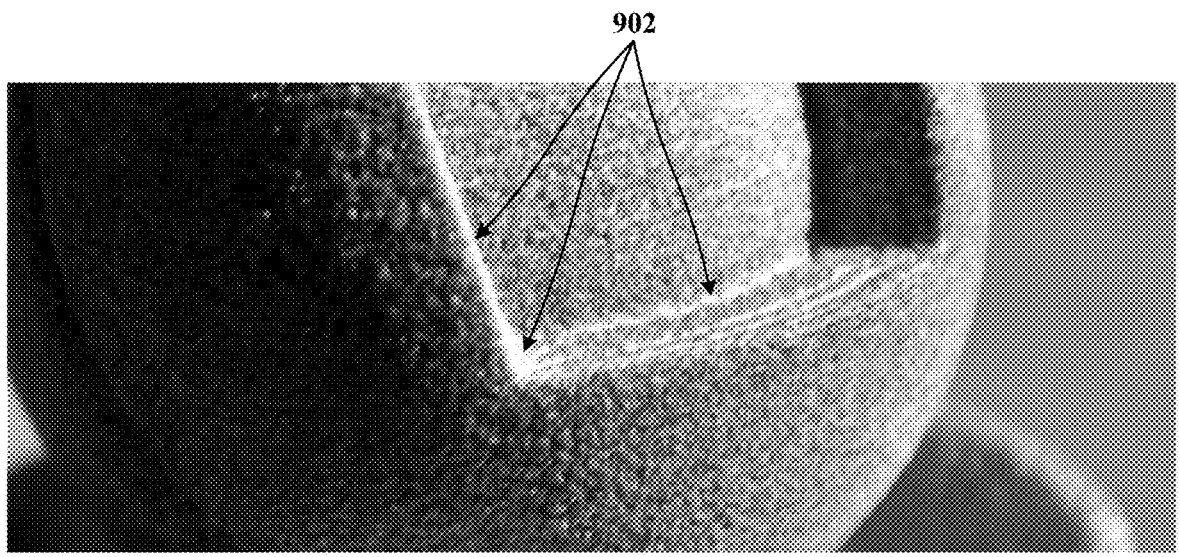
FIG. 9A depicts an exemplary macro photograph of a 3D printed object illustrating a residual surface material on the 3D printed object after sandblasting.

FIG. 9A depicts an exemplary macro photograph of a 3D printed object illustrating a residual surface material 902 on the 3D printed object after sandblasting. As depicted in FIG. 9A, the residual surface material 902 tend to accumulate in the corners and other occluded regions such as concavities and crevices on the 3D printed object. It is contemplated that the generated digital aggregate build-up model of the 3D object can further account for residual surface material in or on the volume before and after sandblasting.

In addition to determining the voxelated surface as described above, the shader and geometric procedural system 300 may receive one or more material parameters of partially bonded residual surface material. The basis for the determination is often rooted in empirical data and includes one or more printer characteristics that correlate with the amount of partially bonded residual surface material. For example, a 3D printer manufacturer can provide empirically determined printer characteristics specific for a binder and powder combination to describe the distribution of unbonded material that results in partially bonded particles that adhere to the surface for non-sandblasted 3D printed objects.

The shader and geometric procedural system 300 may determine an amount of the partially bonded residual surface material included in the volume of added material from the one or more printer characteristics. In some examples, the shader and geometric procedural system 300 uses empirical data to determine the amount of partially bonded residual surface material. For example, determining the amount of partially bonded residual surface material may include correlating the empirical data with a dispersal of particles representative of the partially bonded residual surface material across one or more empty voxels adjacent a boundary voxel according to a probability distribution function.

In such examples, the distribution function is often weighted to give a higher probability to regions of the one or more empty voxels toward corners and regions of the one or more empty voxels in proximity to non-empty voxels. This weighting is observed in the residual surface material 902 depicted in FIG. 9A that occur along the edges, which are more occluded than the non-edge regions. In some examples, the shader and geometric procedural system 300 determines a degree of occluded air-access to one or more surface regions of the digital aggregate build-up model. Once the degree of occluded air-access is determined, the shader and geometric procedural system 300 adjusts the amount of partially bonded residual surface material on the one or more surface regions of the digital aggregate build-up model in proportion to the degree of occluded air-access. For example, the edge cavity regions of FIG. 9A are more occluded to air-access than planar regions. As such, more partially bonded residual surface material is accumulated at the edge regions than at the planar regions, as depicted in FIG. 9A.

In some examples, the shader and geometric procedural system 300 determines a degree of occluded air-access using the hemispherical occlusion, which integrates the visibility function over the hemisphere with respect to the solid angle as follows:

$$A_\rho = \frac{1}{\pi} \int_\Omega V_{\rho,\hat{\omega},D}(\hat{n} \cdot \hat{\omega}) d\omega \qquad (1)$$

where A is the hemispherical occlusion, ρ is the position of the voxel, n̂ is the isosurface normal, and D is the maximum occluding distance. The shader and geometric procedural system 300 calculates the hemispherical occlusion, A, for each boundary voxel in the 3D volume, by tracing rays over the hemisphere into the voxel volume from the current voxel center. The hemisphere direction is aligned with the isosurface normal, n̂, of the boundary nearest p or the voxel face normal itself. The maximum distance traced, D, is an input to the shader and geometric procedural system and is determined by empirical analysis of the 3D printer's printing characteristics. The hemispherical occlusion is determined by integrating the visibility function over the hemisphere with respect to the solid angle.

To represent the partially bonded material powder, the shader and geometric procedural system 300 implements a distribution function. In some examples, particles of the partially bonded residual surface material are dispersed on a voxelated surface according to a distribution function such as blue noise Poisson disk distributions. For example, to represent a thin layer of particles the shader and geometric procedural system 300 implements a blue noise Poisson disk sampling algorithm, where the particles are distributed onto the boundary voxel faces with distance, r, between samples based on the size of an individual powder grain, s, and the hemispherical occlusion A. The hemispherical occlusion, A, is related to the appearance of non-bonded powder, where A represents the coverage of the powder over the surface. As the space between the particles is increased the effective coverage is reduced. In some examples, the hemispherical occlusion, A, value is biased to match empirical findings. The minimum distance between particles r for the blue noise algorithm is calculated as follows:

$$r = 2 \cdot r_b \qquad (2)$$

where $r_b$ is the radius of the particle ($r_b$=sqrt($a_b/\pi$)), $a_b$ is the area of the particle ($a_b$=/(nA)), $a_v$ is the area of the voxel face ($a_v$=x·y), and n is the number of particles.

Once the amount of partially bonded residual surface material is determined using the distribution function, the shader and geometric procedural system 300 adjusts the one or more material parameters of the volume of added material based on one or more physical material properties of the partially bonded residue and the amount of partially bonded residual surface material. That way, the shader and geometric procedural system 300 determines a higher albedo for an object coated with a partially bonded residual surface material that is reflective (e.g., albedo of 1.0) than for the same object coated with a partially bonded residual surface material that is non-reflective (e.g., albedo of 0.0). Likewise, the shader and geometric procedural system 300 determines a higher albedo for a non-reflective object that is heavily coated with a is highly reflective partially bonded residual surface material than for the same non-reflective object that is lightly coated with the same highly reflective partially bonded residual surface material.

To accurately represent the object, the shader and geometric procedural system 300 adjusts the albedo of an object based on both the albedo of the partially bonded residual surface material and the amount of partially bonded residual surface material that remains on the surface of the object. In some examples, particles of the partially bonded residual surface material are rendered as spheres. For example, the shader and geometric procedural system 300 can render particles as spheres using a bidirectional reflectance distribution function (BRDF). In some examples, for distances at which the projected voxel size in raster space is less than one voxel, the shader and geometric procedural system 300 models the partially bonded powder using a bidirectional reflectance distribution function (BRDF) on the voxel face itself with an opacity factor of the hemispherical occlusion, A.

Once the amount of partially bonded residual surface material is determined, the one or more material parameters of the volume of added material are adjusted based on coverage of the partially bonded residual surface material. It should be appreciated that the shader and geometric procedural system 300 can model the accumulation of the partially bonded powder and adjust the one or more material parameters of the volume of added material based on one or more physical material properties of the partially bonded residual material and the amount of partially bonded residual surface material before or after sandblasting post process.

In some examples, the shader and geometric procedural system 300 adapts the distribution of the partially bonded residual surface material based on proximity to the 3D object. For example, a zoomed-in portion of a 3D object depicts surface artifacts that are undistinguishable when zoomed out. To account for this, the shader and geometric procedural system 300 adapts the probabilistic distribution such that there are more particle near regions with many neighboring full voxels, and near concavities and fewer elsewhere. The resulting particles that are not within the particle radius of a voxel wall or other particles are either culled or moved to have them settle or fall away from the surface, the end result being a 3D particle structure that represents the partially bonded particles that will result from the less-than-perfect printing.

5. Material Property Variance

Figure 9B:
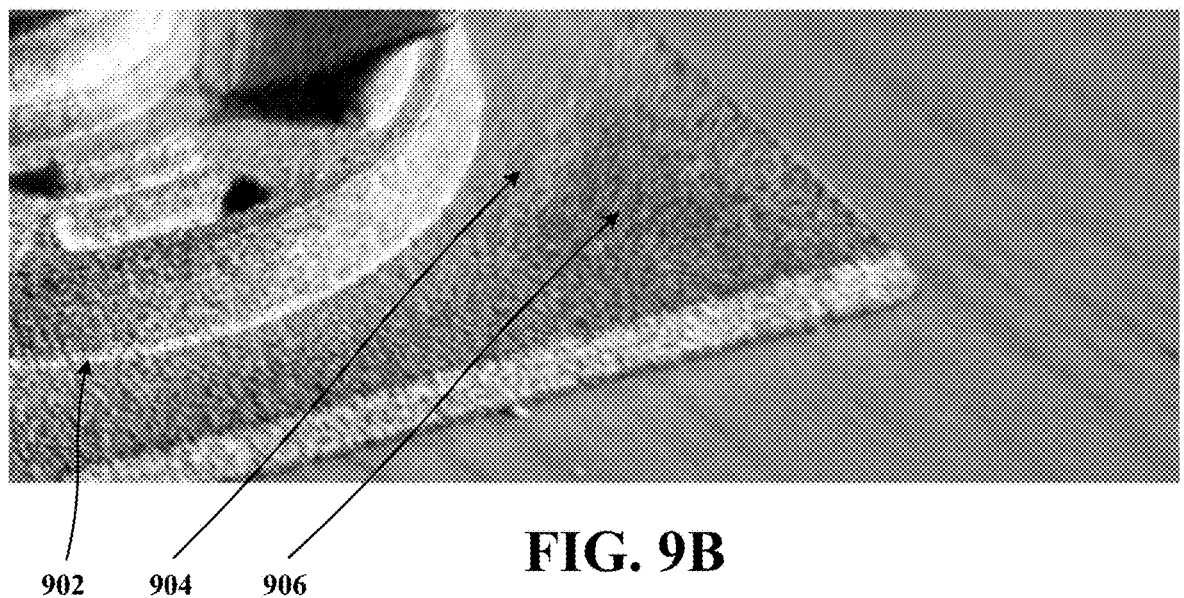
FIG. 9B depicts an exemplary macro photograph of a 3D printed object illustrating variation in the material appearance due to uneven heating and cooling during the printing.

Uneven heating and cooling during the printing process can result in unintended spatial variation of the surface properties (e.g., albedo, roughness, etc.). FIG. 9B depicts an exemplary macro photograph of a 3D printed object illustrating variation in the material appearance due to uneven heating and cooling during the printing. Notably, the surface texture depicted in FIG. 9B varies, where the lighter region 904 was subjected to a different heating/cooling profile than the adjacent darker region 906.

The shader and geometric procedural system 300, implements solid texture functions using the one or more material parameters to model these unintended spatial variations. In general, the shader and geometric procedural system 300 utilizes the one or more material parameters in conjunction with 3D solid texture functions to model the variation of material properties in 3D space during rendering.

In some examples, receiving the one or more material parameters of a volume of the added material that forms the 3D object includes receiving raw empirical material texture data. In such examples, the shader and geometric procedural system 300 sorts the raw empirical material texture data based on some criteria. In some examples, the sorted material properties function as a lookup table (LUT) that is used to vary surface textures during rendering to show uneven heating/cooling profiles. The sorting technique is based on the characteristics of the scanned data and best qualities are generally achieved by sorting the data by the material parameter that is dominant in driving the visual variation of the material (e.g., albedo), and sorting by the aspect of that parameter that shows the most variance (e.g., luminance).

FIGS. 10A-10D depicts an example of raw empirical material texture that is sorted by luminance, value, and saturation. FIG. 10A depicts the raw empirical material texture 1002, FIG. 10B depicts the raw empirical material texture sorted by luminance 1002A, FIG. 10C depicts the raw empirical material texture sorted by value 1002B, and FIG. 10D depicts the raw empirical material texture sorted by saturation 1002C. As depicted in FIGS. 10B and 10C, the raw empirical material texture sorted by luminance 1002A and the raw empirical material texture sorted by value 1002B have similar dark to light profiles. In contrast, the raw empirical material texture sorted by saturation 1002C of FIG. 10D has striations of dark to light similar to grains of wood. It should be appreciated that the raw empirical material texture sorted by luminance 1002A, the raw empirical material texture sorted by value 1002B, and the raw empirical material texture sorted by saturation 1002C can have other profiles, particularly for colored textures. It should also be appreciated that other sorting criteria can be employed such as hue, contrast, etc.

Once the one or more material parameters are sorted, the shader and geometric procedural system 300 analyzes the data to determine parameters for one or more noise functions. In general, a noise function includes a set of inputs (e.g., 2D or 3D position, frequency, etc.) that yields an output of a continuous scalar ranging from 0 to 1. The parameters for the one or more noise functions are based on a variance of the bidirectional reflectance distribution function from the one or more material parameters of the volume of the added material at a voxelated surface. In some examples, the parameters for the one or more noise functions are derived from digital or analog photographic media of the one or more exemplary printed 3D objects using any combination of frequency-domain analyses, machine learning techniques, or direct user input or guidance.

FIG. 10E depicts an exemplary noise function generated material texture 1004. As depicted in FIG. 10E, the noise function generated material texture 1004 exhibits a visually similar set of frequencies and features as the raw empirical material texture 1002 depicted in FIG. 10A.

The one or more noise functions used to generate material texture 1004 has, in general, a non-uniform distribution, as depicted in the distribution 1106 of FIG. 11. This non-uniform distribution causes the visual distinctions between the noise function generated material texture 1004 of FIG. 10E and the raw empirical material texture 1002 depicted in FIG. 10A. To better approximate the raw empirical material texture 1002, the shader and geometric procedural system 300 determines a probability integral transformation that makes the distribution of the output of the one or more noise functions uniform. In some examples, the shader and geometric procedural system 300 executes the probability integral transformation on one or more voxels across the voxelated surface of the build-up model to vary the one or more material parameters properties of the volume of the added material.

FIG. 11 depicts a texture 1102 generated from a non-uniform texture. As depicted in FIG. 11, the generated material texture 1004 has a non-uniform noise function distribution 1106 where the number of pixels that contain that value represented along the ordinate (i.e., y-axis) peaks disproportionately for values of the pixel represented along the abscissa (i.e., x-axis). This means that the generated material texture 1004 adds more noise disproportionally to certain parameters of the bidirectional reflectance distribution function, which is not empirically observed as contrasted between the raw empirical material texture 1002 depicted in FIG. 10A and the noise function generated material texture 1004 depicted in FIG. 10E. To better approximate the raw empirical material texture 1002, a probability integral transformation 1104 is determined where the number of pixels that contain that value represented along the ordinate (i.e., y-axis) are nearly equal for each value of the pixel represented along the abscissa (i.e., x-axis) of the histogram. As depicted in FIG. 11, a flat profile produces a nearly uniform noise function distribution 1108. Once the probability integral transformation 1104 is determined, the probability integral transformation 1104 is applied to the output of the one or more noise functions. In some examples, the output is used to look up the sorted raw empirical material properties, which yields a texture whose distribution roughly matched the raw empirical material texture's distribution 1102.

Notably, the generated material texture 1004 includes parameters that partially describe a bidirectional reflectance distribution function (BRDF), which results in a biased set of material properties, whereas the uniformly generated texture 1102 applies the probability integral transformation 1104 to the output of the one or more noise functions, which results in a generated texture 1102 whose distribution and visual qualities are similar to the raw empirical material texture 1002 depicted in FIG. 10A.

The noise signal to material property mapping can be applied both to translucent objects as well as non-translucent objects. For non-translucent objects the shader and geometric procedural system 300 executes the probability integral transformation 1104 on the output of the one or more noise functions at the one or more voxels across the voxelated surface of the build-up model to vary the one or more material parameters at the surface of the added material. For translucent objects the shader and geometric procedural system 300 executes the probability integral transformation 1104 on the output of the one or more noise functions at the one or more voxels across voxels of the build-up model to vary the one or more material parameters of the voxel of the volume that forms the 3D object.

Figure 12:
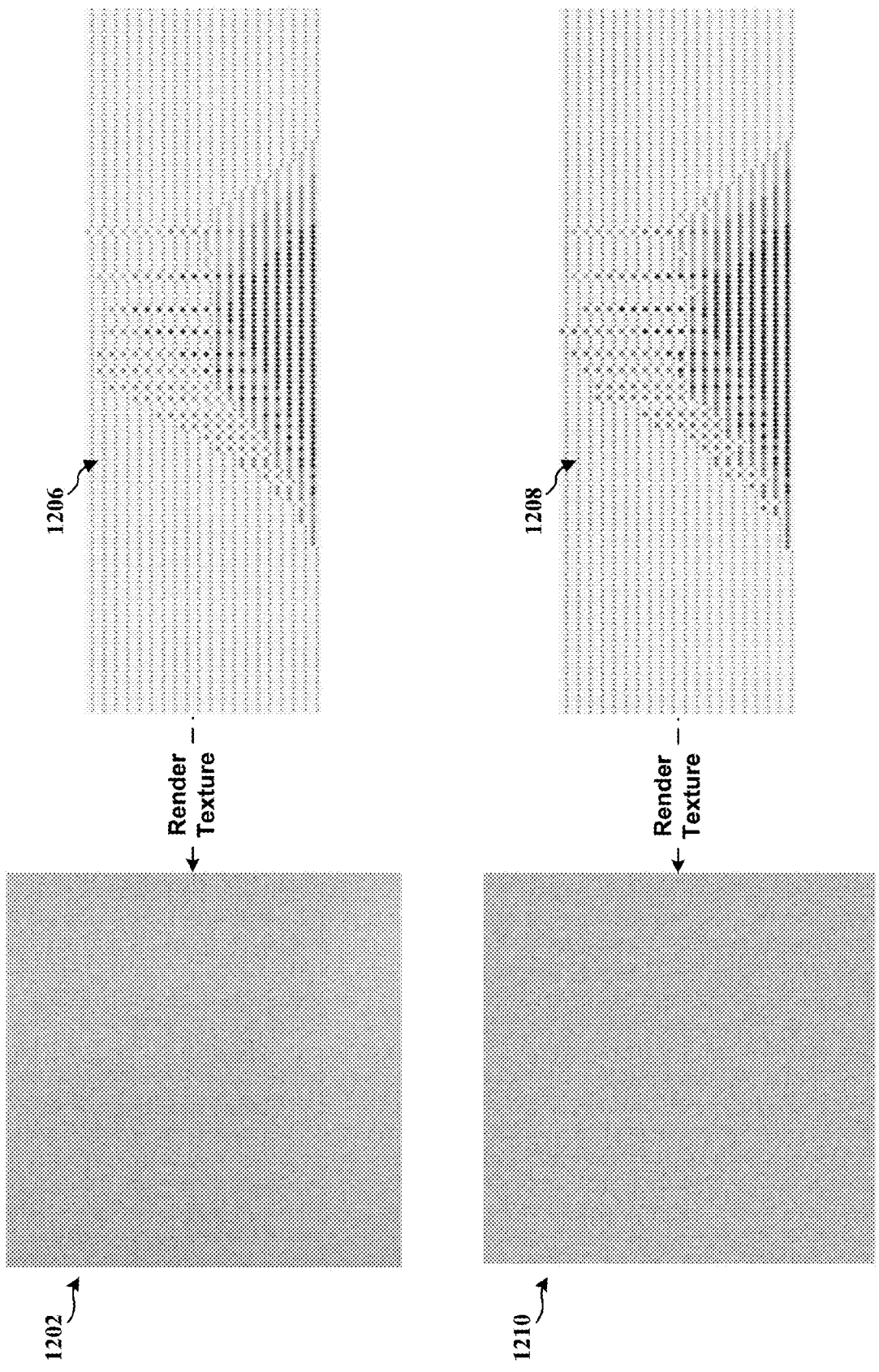
FIG. 12 depicts an example of raw texture with a corresponding histogram decomposed into red, green, and blue (RGB) colors contrasted with the procedurally generated texture with a corresponding histogram decomposed into RGB colors.

FIG. 12 depicts an example of raw texture 1202 with a corresponding histogram 1206 decomposed into red, green, and blue (RGB) colors contrasted with the procedurally generated texture 1210 with a corresponding histogram 1208 decomposed into RGB colors. In both histograms 1206 and 1208, the number of pixels that contain that value are represented along the ordinate (i.e., y-axis) and the value of the pixel represented along the abscissa (i.e., x-axis), As depicted in FIG. 12, the raw empirical material texture 1202 is similar to the generated texture 1210. Likewise, the corresponding histogram 1206 is similar to the corresponding procedurally generated histogram 1208.

Figure 13:
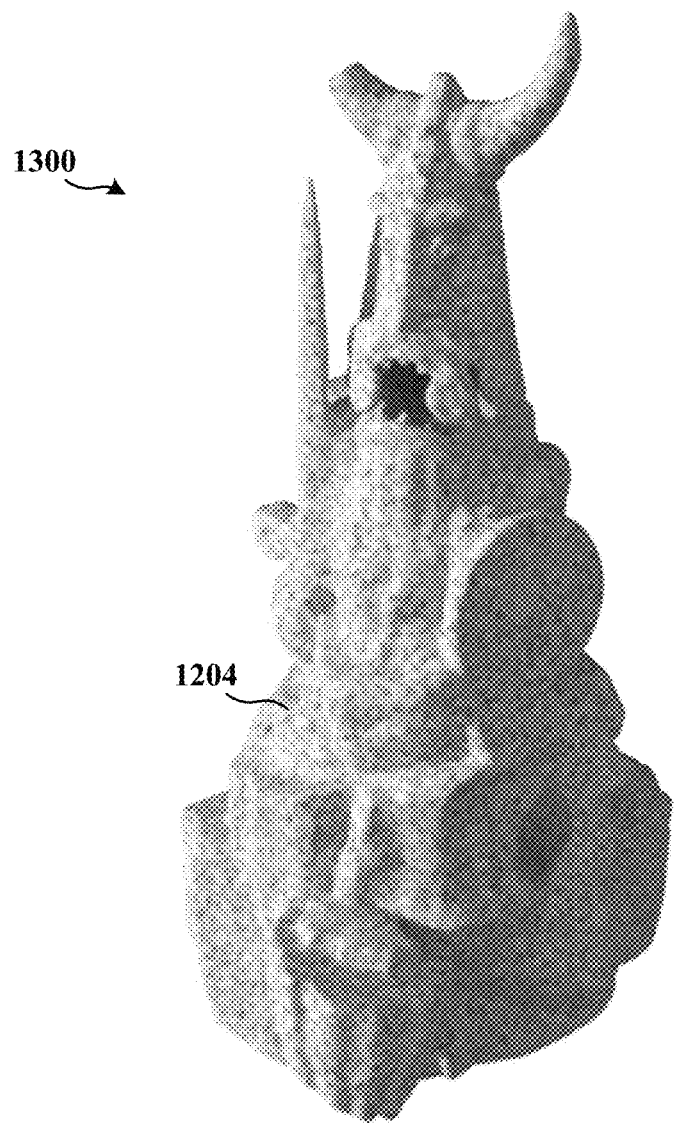
FIG. 13 depicts an example of a generated surface texture rendered on a 3D model.

FIG. 13 depicts an example of a generated surface texture 1210 rendered on a 3D model 1300. In some examples, the shader and geometric procedural system 300 executes the mapping of one or more noise signals to a sorted set of material properties at one or more voxels across the voxelated surface of the build-up model to vary the one or more material parameters properties of the volume of the added material.

For instances where voxels of the material used in the 3D printing are heterogeneous, and translucent (not completely opaque), an exemplary method is described below where, as rays pass through the interior voxels of the volume, the varied nature of the voxels is accounted for in the light scattering properties.

The shader and geometric procedural system uses volume rendering techniques to visualize objects to be printed when translucent materials are required. These objects may be made of materials that are homogeneous or heterogeneous in terms of their optical properties. In both cases, the shader and geometric procedural system 300 can model unintentional variations in the material properties that occur due to the uneven heating and cooling that occurs during the printing process.

These variations are achieved using data that is specifically computed for each model of 3D printer that is supported by the shader and geometric procedural system 300. The characteristics of a given printer are analyzed and this information is used to visualize the variation in appearance that is typical for that printer model. Multiple exemplar parts are printed with a homogeneous material, and the optical properties of these materials are acquired using any of several standard material capture techniques, including material scanning, photography, or other data sources.

As in the previous example described, the scanned data is transformed into an array with each element representing the complete set of material properties. Statistics are computed for each material property to understand the printer's characteristics in terms of unintended variations in resulting 3D printed material properties. These variations are then modeled procedurally using solid texture functions.

When employing volume rendering for visualizing a part that is to be printed using a homogeneous material, an initial set of material properties is given by the printer. Rather than using this single set of properties for rendering all voxels, the properties for each voxel are generated based on a variation of the solid texturing technique described above. In the case where the material properties are intended to be homogeneous throughout the volume, the material properties from the solid texturing technique described above are used directly. For each voxel to be rendered, the material properties are derived from the solid texture function and stored in a volume data structure (voxel grid) for lookup during rendering.

For cases where the material properties are intended to be heterogeneous within the volume of the printed part (for example, differing colors or aggregate printing material are used), the varying target material properties can be first stored in a temporary voxel grid. The initial set of intended optical material properties are provided to the system in the form of a 3D volume data set defined by the printer. A variation of the solid texturing technique described above is used to modify each of these material properties by adding variation to the properties stored at each voxel before the rendering stage.

An analysis is performed on material data scanned from a series of printed exemplar parts, and the typical variance of each material property is measured individually, taking notice of material properties that are correlated so they can be synthesized with the same dependent correlation. Additionally, parameters for the solid texture function are derived that produce a signal that exemplifies the pattern commonly produced by the printer. For each voxel to be printed, the solid texture function is evaluated and transformed as previously described.

Figure 14:
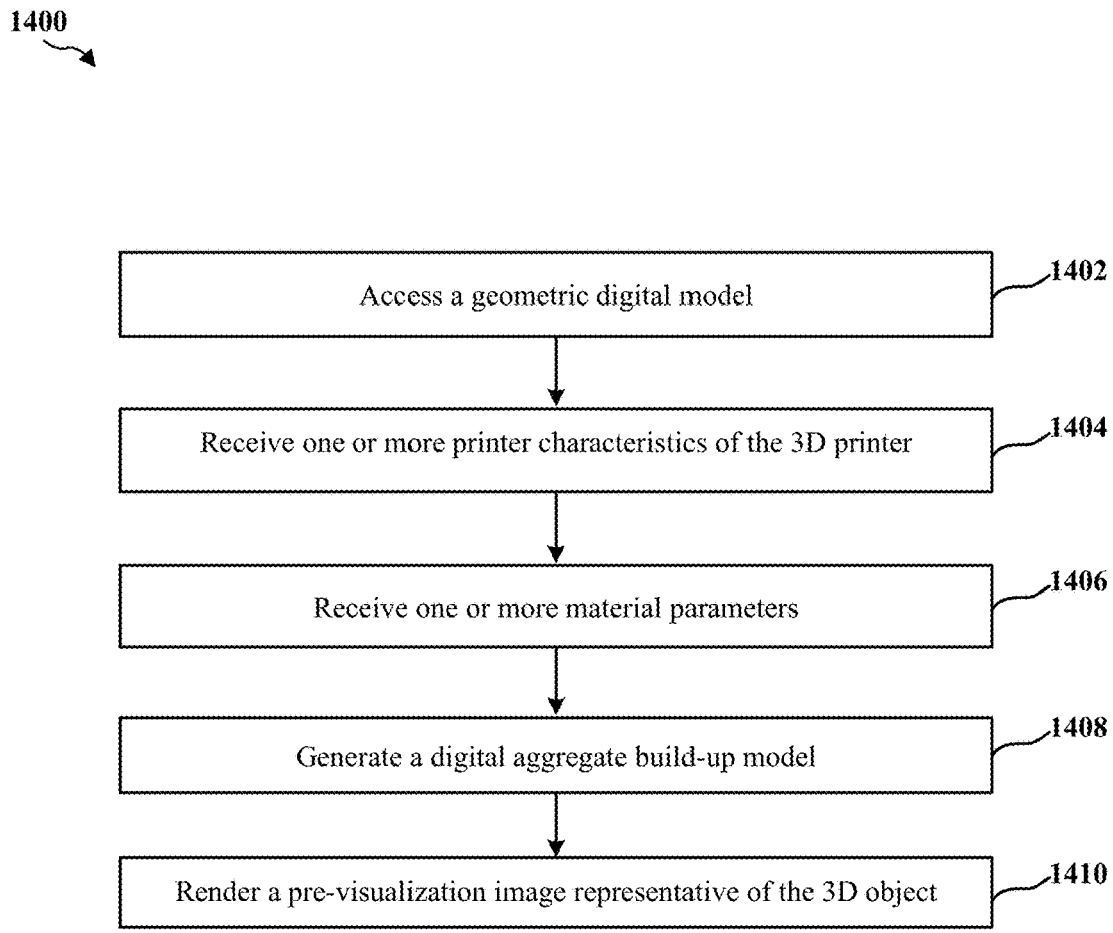
FIG. 14 is an exemplary flow diagram for rendering a pre-visualization image representative of a 3D object to be printed by a 3D printer.

FIG. 14 is an exemplary flow diagram for rendering a pre-visualization image representative of a 3D object to be printed by a 3D printer. Process 1400 can be performed by a computer or other electronic device that is configured with a geometric procedural to create 3D models of textures, such as fabric, fur and hair algorithmically.

At operation 1402, process 1400 accesses a geometric digital model of the 3D object. For example, the shader and geometric procedural system 300 can access a CAD software with the geometric digital model of the 3D object.

At operation 1404, process 1400 receives one or more printer characteristics of the 3D printer. The one or more printer characteristics are associated with settlement of added material to the 3D object by the 3D printer. In some examples, the one or more printer characteristics of the 3D printer may be printer dependent properties that correspond to the precision of the 3D printer for depositing the added material to the 3D object. The characterization of the settlement of added material to the 3D object can be quantified using coefficients. For example, in some examples, the one or more printer characteristics can include coefficients for at least one of target temperature, print time, horizontal voxel resolution, vertical voxel resolution, print/bin volume, and edge precision. In some examples, the one or more printer characteristics include corner curvature of the volume of added material based on heat dissipation properties of the printer and the volume of the added material.

In some examples where the 3D printer is electrically coupled to the electronic device, receiving the one or more printer characteristics of the 3D printer includes auto-detecting the 3D printer and determining the one or more printer characteristics from the auto-detected 3D printer. Such examples may include, receiving the one or more printer characteristics of the 3D printer that are extracted from a configuration file. Such examples may include, receiving the one or more printer characteristics of the 3D printer that are entered through a user interface (e.g., graphical user interface).

At operation 1406, process 1400 receives one or more material parameters of a volume of the added material that forms the 3D object. In some examples, the one or more material parameters of the volume of the added material include coefficients to characterize at least one of single-scattering albedo, attenuation (e.g., extinction coefficient or absorptivity), anisotropy, scattering (e.g., surface scattering, subsurface scattering, etc.), refractive index, thermal conductivity, electrical conductivity, and diffusion. In some examples, the one or more material parameters include raw empirical material texture data. In some examples, the one or more material parameters include volumetric parameters associated with the raw empirical material texture data.

At operation 1408, process 1400 generates a digital aggregate build-up model of the 3D object using the geometric digital model with the one or more printer characteristics and the one or more material parameters. In some examples, generating the digital aggregate build-up model includes determining a surface of surrounding voxels and generating by a polygonal tessellation mesh for a non-uniform rational basis spline or subdivision surface.

As discussed above in reference to FIG. 4A, marching cubes is one approach for generating the digital aggregate build-up model, where the object is surrounded with a voxelated surface that has a stair-step geometry. To form the stair-step geometry, a voxel grid is overlaid with the geometric digital model of the 3D object where at least one dimension of a voxel of the voxel grid corresponds to a minimum resolution of the 3D printer. Once the voxel grid is overlaid, a voxelated surface of the build-up model is determined. The voxelated surface corresponds to external surfaces of one or more adjacent voxels of the voxel grid, where the one or more adjacent voxels of the voxel grid include an internal surface segment that intersects with a surface segment of the geometric digital model of the 3D object. In some examples, the internal surface segment is situated at least a predetermined distance from a voxel edge. In some examples, the predetermined distance from a voxel edge is a bevel width of a concave or convex edge. After the voxelated surface of the build-up model is determined, a surface of the build-up model corresponding to the surface of the geometric digital model of the 3D object to the voxelated surface is adapted. Generally, the voxelated surface forms sharp corners and sharp edges and stair-step geometry.

As discussed above in reference to FIGS. 4B, 5A-5C, and 6, procedural bevels is another approach for generating the digital aggregate build-up model, adapting the above approach by rounding corners of the voxelated surface along a concave external surface edge between two or more orthogonally adjacent surfaces of two or more voxels and/or beveling one or more edges to the voxelated surface along a convex edge of two or more orthogonally adjacent surfaces of a voxel. Thus, instead of having a stair-step geometry with sharp corners and sharp edges this approach has a stair-step geometry with rounded corners and beveled edges.

As discussed above in reference to FIGS. 7A, 7B, 8A, and 8B, procedural level sets are another approach for generating the digital aggregate build-up model. To build a level set, a voxel grid that spans a volume that encloses the 3D object is overlaid with the geometric digital model of the 3D object. In general, at least one dimension of a voxel of the voxel grid corresponds to a minimum resolution of the 3D printer. Once the voxel grid is overlaid, a field value is associated with each voxel in the dimensions of the voxel grid that encloses the 3D object. After associating the field value, a voxelated surface of the build-up model is determined, which can include determining one or more roots of one or more field values in the dimensions of the voxel grid that encloses the 3D object. In this instance, the voxelated surface corresponds to a level set evaluated along a surface of the geometric digital model of the 3D object where the field value remains a constant. Notably, voxels intersecting the surface of the geometric digital model of the 3D object have a mid-range field value, voxels interior the 3D object have a field value set lower than the mid-range field value, and voxels exterior the 3D object have a field value set to greater than the mid-range field value. As such, the voxelated surface corresponds to the level set for evaluated field values close to the mid-range field value. When properly executed, the level set forms edges, and corners of the voxelated surface are rounded or beveled.

In some examples, generating the digital aggregate build-up model of the 3D object can further account for residual surface material in or on the volume of added material. To account for residual surface material is to determine an amount of partially bonded residual surface material included in the volume of added material from the one or more printer characteristics and adjust the one or more material parameters of the volume of added material based on one or more material properties of the partially bonded residual material and the amount of partially bonded residual surface material. Representing the partially bonded residual surface material can include dispersing particles across one or more empty voxels adjacent a boundary voxel according to a probability distribution function. Sometimes a higher probability is given to regions of the one or more empty voxels toward corners and regions of the one or more empty voxels in proximity to non-empty voxels.

In some examples, particles of the partially bonded residual surface material are dispersed on a voxelated surface according to a distribution function such as blue noise Poisson disk distributions. In some examples, the distribution function includes a particle size parameter. In some examples, particles of the partially bonded residual surface material are rendered as spheres using a Lambertian bidirectional reflectance distribution function.

In some examples, generating the digital aggregate build-up model of the 3D object can further determine a degree of occluded air-access to one or more surface regions of the digital aggregate build-up model and adjusts the amount of partially bonded residual surface material on the one or more surface regions of the digital aggregate build-up model in proportion to the degree of occluded air-access. In some examples, determining a degree of occluded air-access further includes integrating a visibility function over a hemisphere measured from a center of a current voxel with a direction that is aligned with the isosurface normal of a boundary nearest the center of the current voxel (e.g., voxel face normal of the current voxel) with respect to a solid angle. The amount of partially bonded residual surface material represented is proportionate to the degree of occluded air-access. The one or more material parameters of the volume of added material are adjusted based on the amount of partially bonded residual surface material that has been determined.

In some examples, generating the digital aggregate build-up model of the 3D object can further account for environmental effects on the volume of added material. In some examples, this includes determining changes in one or more material parameters of the volume from one or more thermal stresses applied to the volume of added material. Such thermal stresses are caused from temperature gradients, thermal expansion or contraction, thermal shocks, etc. Once the changes in one or more material parameters of the volume from one or more thermal stresses are determined, process 1400 adjusts the one or more material parameters of the volume of added material along regions exposed to the one or more thermal stresses based on the changes in one or more physical material properties. In some examples, the one or more material parameters of the volume of the added material include coefficients to characterize the bidirectional reflectance distribution function of the volume of added material.

In some examples, rather than generating a full digital aggregate build-up model, process 1400 perturbs one or more surface normals in the geometric digital model of the 3D object to form a digital perturbation model of the 3D object. This gives the surface an appearance of roughness or bumpiness to the geometric digital model of the 3D object that can then be rendered quickly. Rendering the digital perturbation model of the 3D object provides for a quick-preview that is an approximation of the full digital aggregate build-up model.

At operation 1410, process 1400 renders a pre-visualization image representative of the 3D object as the 3D object would be printed by the 3D printer based on the generated digital aggregate build-up model. In some examples, process 1400 determines one or more parameters for one or more noise functions. For both transparent and non-transparent materials, the one or more noise parameters are based on the one or more material parameters given by the raw texture as well as the printer characteristics. In some examples, the material properties are derived from digital or analog photographic media of the one or more exemplary printed 3D objects using any combination of frequency-domain analyses, machine learning techniques, or direct user input.

After the average output of the one or more noise functions over some range of inputs is analyzed and a cumulative distribution function is derived, process 1400 determines a probability integral transformation that makes the output of the one or more noise signals uniform in distribution. The probability integral transformation is then executed on one or more voxels across the voxelated surface of the build-up model to vary the one or more material parameters of the volume of the added material.

In some examples, rendering a pre-visualization image representative of the 3D object includes applying one or more environmental effects. In general, the environmental effects cause a variance in the one or more material parameters so that the 3D object has a slightly different appearance. The digital aggregate build-up model of the 3D object takes these variations into account to yield a similar rendered image. Environmental effects include temperature, wind, erosion, and aging, etc.

It is understood that the specific order or hierarchy of blocks in the processes and/or flowcharts disclosed is an illustration of exemplary approaches. Based upon design preferences, it is understood that the specific order or hierarchy of blocks in the processes and/or flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but are to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other examples. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various examples described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed under 35 U.S.C. § 112(f) unless the element is expressly recited using the phrase "means for."

What is claimed is:

1. A non-transitory computer-readable storage medium storing one or more programs configured to be executed by one or more processors of an electronic device for rendering a pre-visualization image representative of a 3D object to be printed by a 3D printer, the one or more programs including instructions for:

accessing a geometric digital model of the 3D object;
   receiving one or more printer characteristics of the 3D printer, wherein the one or more printer characteristics are associated with settlement of added material to the 3D object by the 3D printer;
   receiving one or more material parameters of a volume of the added material that forms the 3D object;
   generating a digital aggregate build-up model of the 3D object using the geometric digital model, the one or more printer characteristics, and the one or more material parameters, wherein generating the digital aggregate build-up model includes:
   determining a voxelated surface of the build-up model; and
   either or both:
      adding one or more bevel edges to the voxelated surface along a concave external surface edge between two or more orthogonally adjacent surfaces of two or more voxels, and
      beveling one or more edges to the voxelated surface along a convex edge of two or more orthogonally adjacent surfaces of a voxel; and
   rendering a pre-visualization image representative of the 3D object as the 3D object would be printed by the 3D printer based on the generated digital aggregate build-up model.

2. The non-transitory computer-readable storage medium of claim 1, wherein the one or more programs further includes instructions for:
   receiving one or more environmental parameters, wherein the one or more environmental parameters include any one of ambient temperature, ambient humidity, and altitude, and wherein the digital aggregate build-up model is further generated using the one or more environmental parameters.

3. The non-transitory computer-readable storage medium of claim 1, wherein accessing the geometric digital model of the 3D object includes receiving a position and an orientation of the geometric digital model of the 3D object with respect to coordinates of the 3D object as referenced by the 3D printer.

4. The non-transitory computer-readable storage medium of claim 1, wherein the 3D printer is electrically coupled to the electronic device, and wherein receiving the one or more printer characteristics of the 3D printer includes:
   auto-detecting the 3D printer; and
   determining the one or more printer characteristics from the auto-detected 3D printer.

5. The non-transitory computer-readable storage medium of claim 1; wherein the one or more material parameters of the volume of the added material include coefficients to characterize at least one of single-scattering albedo, volumetric absorption, scattering, anisotropy, refractive index, thermal conductivity, electrical conductivity, and diffusion.

6. The non-transitory computer-readable storage medium of claim 1, wherein the one or more printer characteristics include coefficients for at least one of target temperature, print time, horizontal voxel resolution, vertical voxel resolution, print/bin volume, and edge precision.

7. The non-transitory computer-readable storage medium of claim 1; wherein generating the digital aggregate build-up model includes determining a surface of surrounding voxels and generating a polygonal tessellation mesh for a non-uniform rational basis spline or subdivision surface.

8. The non-transitory computer-readable storage medium of claim 1, wherein generating the digital aggregate build-up model further includes:
overlaying the geometric digital model of the 3D object with a voxel grid where at least one dimension of a voxel of the voxel grid corresponds to a minimum resolution of the 3D printer;
determining a voxelated surface of the build-up model, wherein the voxelated surface corresponds to external surfaces of one or more adjacent voxels of the voxel grid, and wherein the one or more adjacent voxels of the voxel grid include an internal surface segment that intersects with a surface of the geometric digital model of the 3D object; and
adapting a surface of the build-up model corresponding to the surface of the geometric digital model of the 3D object to the voxelated surface.

9. The non-transitory computer-readable storage medium of claim 8, wherein the voxelated surface forms sharp edges and stair-step geometry.

10. The non-transitory computer-readable storage medium of claim 8, wherein the internal surface segment is situated at least a predetermined distance from a voxel edge.

11. The non-transitory computer-readable storage medium of claim 1, wherein rendering a pre-visualization image representative of the 3D object includes:
applying one or more environmental effects.

12. The non-transitory computer-readable storage medium of claim 1, wherein generating the digital aggregate build-up model further includes:
overlaying the geometric digital model of the 3D object with a voxel grid that spans a volume that encloses the 3D object, wherein at least one dimension of a voxel of the voxel grid corresponds to a minimum resolution of the 3D printer;
associating a field value for each voxel in the dimensions of the voxel grid that encloses the 3D object; and
determining a voxelated surface of the build-up model, wherein the voxelated surface corresponds to a level set evaluated along a surface of the geometric digital model of the 3D object where the field value remains a constant.

13. The non-transitory computer-readable storage medium of claim 12, wherein voxels intersecting the surface of the geometric digital model of the 3D have a mid-range field value, voxels interior the 3D object have a field value set lower than the mid-range field value, and voxels exterior the 3D object have a field value set to greater than the mid-range field value.

14. The non-transitory computer-readable storage medium of claim 13, wherein determining the voxelated surface of the build-up model includes:
determining one or more roots of one or more field values in the dimensions of the voxel grid that encloses the 3D object, wherein the voxelated surface corresponds to the level set for evaluated field values close to the mid-range field value.

15. The non-transitory computer-readable storage medium of claim 14, wherein edges and corners of the voxelated surface are rounded or beveled.

16. The non-transitory computer-readable storage medium of claim 1, wherein the one or more material parameters include diffusion coefficients to characterize diffusion across adjacent volumes of added material.

17. The non-transitory computer-readable storage medium of claim 1, wherein generating the digital aggregate build-up model of the 3D object further includes:
receiving one or more material parameters of partially bonded residual surface material;
determining an amount of the partially bonded residual surface material included in the volume of added material from the one or more printer characteristics; and
adjusting the one or more material parameters of the volume of added material based on one or more material parameters of the partially bonded residual and the amount of partially bonded residual surface material.

18. The non-transitory computer-readable storage medium of claim 17; wherein generating the digital aggregate build-up model of the 3D object further includes:
determining a degree of occluded air-access to one or more surface regions of the digital aggregate build-up model;
adjusting the amount of partially bonded residual surface material on the one or more surface regions of the digital aggregate build-up model in proportion to the degree of occluded air-access.

19. The non-transitory computer-readable storage medium of claim 18, wherein determining a degree of occluded air-access further includes:
integrating a visibility function over a hemisphere measured from a center of a current voxel with a direction that is aligned with the isosurface normal of a boundary nearest the center of the current voxel with respect to a solid angle.

20. The non-transitory computer-readable storage medium of claim 17, wherein particles representing partially bonded residual surface material are generated on a voxelated surface according to a distribution function.

21. The non-transitory computer-readable storage medium of claim 20, wherein the distribution function includes a particle size parameter.

22. The non-transitory computer-readable storage medium of claim 21, wherein particles representing the partially bonded residual surface material are rendered as spheres using a bidirectional reflectance distribution function.

23. The non-transitory computer-readable storage medium of claim 17, wherein determining the amount of partially bonded residual surface material includes:
determining a distribution of particles representative of the partially bonded residual surface material across one or more empty voxels adjacent a boundary voxel according to a probability distribution function, wherein a higher probability is given to:
regions of the one or more empty voxels toward corners, and
regions of the one or more empty voxels in proximity to non-empty voxels.

24. The non-transitory computer-readable storage medium of claim 1, wherein generating the digital aggregate build-up model of the 3D object further includes:
   determining changes in one or more material parameters of the volume from one or more thermal stresses applied to the volume of added material; and
   adjusting the one or more material parameters of the volume of added material along regions exposed to the one or more thermal stresses based on the changes in one or more material parameters.

25. The non-transitory computer-readable storage medium of claim 1, wherein the one or more material parameters of the volume of the added material include coefficients to characterize bidirectional reflectance distribution function data of the volume of added material.

26. The non-transitory computer-readable storage medium of claim 1, wherein the one or more programs further includes instructions for:
   perturbing one or more surface normals in the geometric digital model of the 3D object to form a digital perturbation model of the 3D object; and
   rendering a pre-visualization image of the digital perturbation model of the 3D object as the 3D object would be printed by the 3D printer.

27. The non-transitory computer-readable storage medium of claim 1, wherein rendering a pre-visualization image representative of the 3D object includes:
   sorting the acquired material properties from one or more exemplary 3D printed objects according to a criteria;
   determining a noise function based on a variance of a bidirectional reflectance distribution function from the sorted acquired material properties;
   determining a probability integral transformation that makes a distribution of the noise function uniform; and
   applying the probability integral transformation to the noise function to vary the one or more material parameters of the volume of the added material on one or more voxels across the voxelated surface of the build-up model.

28. The non-transitory computer-readable storage medium of claim 27, wherein the material properties are derived from digital or analog photographic media of the one or more exemplary printed 3D objects using any combination of frequency-domain analyses, machine learning techniques; or direct user input.

29. An electronic device for rendering a pre-visualization image representative of a 3D object to be printed by a 3D printer, the electronic device comprising:
   one or more processors; and
   memory storing one or more programs configured to be executed by the one or more processors, the one or more programs including instructions for:
      accessing a geometric digital model of the 3D object;
      receiving one or more printer characteristics of the 3D printer, wherein the one or more printer characteristics are associated with settlement of added material to the 3D object by the 3D printer;
      receiving one or more material parameters of a volume of the added material that forms the 3D object;
      generating a digital aggregate build-up model of the 3D object using the geometric digital model, the one or more printer characteristics, and the one or more material parameters, wherein generating the digital aggregate build-up model includes:
         determining a voxelated surface of the build-up model; and
         either or both:
            adding one or more bevel edges to the voxelated surface along a concave external surface edge between two or more orthogonally adjacent surfaces of two or more voxels, and
            beveling one or more edges to the voxelated surface along a convex edge of two or more orthogonally adjacent surfaces of a voxel; and
      rendering a pre-visualization image representative of the 3D object as the 3D object would be printed by the 3D printer based on the generated digital aggregate build-up model.

30. A method for rendering a pre-visualization image representative of a 3D object to be printed by a 3D printer, the method comprising:
   accessing a geometric digital model of the 3D object;
   receiving one or more printer characteristics of the 3D printer, wherein the one or more printer characteristics are associated with settlement of added material to the 3D object by the 3D printer;
   receiving one or more material parameters of a volume of the added material that forms the 3D object;
   generating a digital aggregate build-up model of the 3D object using the geometric digital model, the one or more printer characteristics, and the one or more material parameters, wherein generating the digital aggregate build-up model includes:
      determining a voxelated surface of the build-up model; and
      either or both:
         adding one or more bevel edges to the voxelated surface along a concave external surface edge between two or more orthogonally adjacent surfaces of two or more voxels, and
         beveling one or more edges to the voxelated surface along a convex edge of two or more orthogonally adjacent surfaces of a voxel; and
   rendering a pre-visualization image representative of the 3D object as the 3D object would be printed by the 3D printer based on the generated digital aggregate build-up model.

* * * * *